US012574487B1

(12) United States Patent
Renkert et al.

(10) Patent No.: US 12,574,487 B1
(45) Date of Patent: Mar. 10, 2026

(54) SYSTEMS AND METHODS FOR MONITORING CALIBRATION OF A VISION SYSTEM ON A MARINE VESSEL

(71) Applicant: Brunswick Corporation, Mettawa, IL (US)

(72) Inventors: Philip M. Renkert, Urbana, IL (US); Brandon L. Tate, Walnut Hill, IL (US); Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 94 days.

(21) Appl. No.: 18/473,902

(22) Filed: Sep. 25, 2023

(51) Int. Cl.

| | |
|---|---|
| *H04N 13/246* | (2018.01) |
| *B63B 79/30* | (2020.01) |
| *B63B 79/40* | (2020.01) |
| *G01S 7/497* | (2006.01) |
| *H04N 13/00* | (2018.01) |
| *H04N 13/239* | (2018.01) |

(52) U.S. Cl.
CPC ........... *H04N 13/246* (2018.05); *B63B 79/30* (2020.01); *B63B 79/40* (2020.01); *G01S 7/497* (2013.01); *H04N 13/239* (2018.05); *H04N 2013/0081* (2013.01)

(58) Field of Classification Search
CPC ............... H04N 13/246; H04N 13/239; H04N 2013/0081; B63B 79/30; B63B 79/40; G01S 7/497
See application file for complete search history.

(56) References Cited

U.S. PATENT DOCUMENTS

| | | | |
|---|---|---|---|
| 6,273,771 | B1 | 8/2001 | Buckley et al. |
| 9,674,504 | B1 | 6/2017 | Salvagnini |
| 9,927,520 | B1 | 3/2018 | Ward et al. |
| 10,259,555 | B2 | 4/2019 | Ward et al. |
| 10,429,845 | B2 * | 10/2019 | Arbuckle ............... B63H 21/21 |
| 10,430,833 | B2 | 10/2019 | Newman |
| 10,489,912 | B1 | 11/2019 | Brailovskiy |
| 10,705,194 | B2 | 7/2020 | Pfeiffer |
| 11,120,538 | B2 | 9/2021 | Tariq et al. |
| 11,243,539 | B2 | 2/2022 | Kurokawa et al. |

(Continued)

FOREIGN PATENT DOCUMENTS

KR        20150073679 A  *  7/2015  ............... G06T 7/66

OTHER PUBLICATIONS

KR-20150073679-A (Year: 2015).*

(Continued)

*Primary Examiner* — Kito R Robinson
*Assistant Examiner* — Zachary E. F. Glade
(74) *Attorney, Agent, or Firm* — Andrus Intellectual Property Law, LLP

(57) ABSTRACT

A system for monitoring calibration of a vision system on a marine vessel is provided, comprising: a processor configured to: receive a plurality of error metrics, each indicative of a degree of miscalibration between a pair of depth sensors, wherein each of the depth sensors is configured to determine three-dimensional position information of features in an environment of the marine vessel; calculate a calibration health metric based on the plurality of error metrics; determine that the calibration health metric is indicative of at least a threshold degree of miscalibration of at least one of the pair of depth sensors; and generate a calibration alert.

23 Claims, 15 Drawing Sheets

(56) References Cited

U.S. PATENT DOCUMENTS

| | | | |
|---|---|---|---|
| 11,403,955 B2 | 8/2022 | Derginer et al. | |
| 11,436,927 B2 | 9/2022 | Derginer et al. | |
| 11,468,596 B2 | 10/2022 | Tsuchiya | |
| 11,496,722 B1 * | 11/2022 | Satat | G06N 3/0464 |
| 11,572,080 B2 | 2/2023 | Canady et al. | |
| 12,094,175 B2 | 9/2024 | Sheorey | |
| 2014/0152776 A1 * | 6/2014 | Cohen | H04N 13/271 |
| | | | 348/47 |
| 2014/0375773 A1 | 12/2014 | He | |
| 2017/0223341 A1 | 8/2017 | Yatsuri | |
| 2018/0286072 A1 | 10/2018 | Tsai | |
| 2018/0300901 A1 | 10/2018 | Wakai | |
| 2018/0342113 A1 * | 11/2018 | Kislovskiy | G07C 5/008 |
| 2019/0019309 A1 | 1/2019 | Herrli | |
| 2019/0359300 A1 | 11/2019 | Johnson | |
| 2019/0361457 A1 | 11/2019 | Johnson | |
| 2020/0018852 A1 | 1/2020 | Walls et al. | |
| 2020/0027243 A1 | 1/2020 | Ziegler | |
| 2020/0249332 A1 | 8/2020 | Pandey et al. | |
| 2020/0293047 A1 | 9/2020 | Kurokawa | |
| 2021/0003684 A1 | 1/2021 | Gong et al. | |
| 2021/0261226 A1 | 8/2021 | Johnson | |
| 2021/0365029 A1 * | 11/2021 | Molina Cabrera | G05D 1/027 |
| 2022/0050191 A1 * | 2/2022 | Zhu | G01S 17/42 |
| 2022/0109819 A1 | 4/2022 | Thrimawithana | |
| 2023/0027622 A1 * | 1/2023 | Haeusler | G01S 17/89 |
| 2024/0286720 A1 | 8/2024 | Raviv | |
| 2025/0121774 A1 | 4/2025 | Han | |
| 2025/0285333 A1 | 9/2025 | Stefano | |

OTHER PUBLICATIONS

Sipiran, I., Bustos, B. Harris (2011). 3D: a robust extension of the Harris operator for interest point detection on 3D meshes. Vis Comput 27, 963-976. https://doi.org/10.1007/s00371-011-0610-y.

Kim, J.S. (2014). Calibration of Multi-camera Setups. In: Ikeuchi, K. (eds) Computer Vision, 69-72. https://doi.org/10.1007/978-0-387-31439-6_162.

"Static Camera Calibration Tutorial" accessed Aug. 30, 2023 from https://docs.nvidia.com/drive/driveworks-4.0/dwx_camera_calibration.html.

Ahmed, S. M., Tan, Y. Z., Chew, C. M., Mamun, A. A., & Wong, F. S. (2018). Edge and Corner Detection for Unorganized 3D Point Clouds with Application to Robotic Welding (Version 1). arXiv. https://doi.org/10.48550/ARXIV.1809.10468.

"Introduction To Feature Detection and Matching" accessed Aug. 31, 2023 from https://medium.com/data-breach/introduction-to-feature-detection-and-matching-65e27179885d.

Flint, A., Dick, A., & Hengel, A. v. d. (2007). Thrift: Local 3D Structure Recognition. In Digital Image Computing Techniques and Applications. IEEE. https://doi.org/10.1109/dicta.2007.4426794.

Hänsch, R., Weber, T., & Hellwich, O. (2014). Comparison of 3D interest point detectors and descriptors for point cloud fusion. In ISPRS Annals of the Photogrammetry, Remote Sensing and Spatial Information Sciences, 11(3), 57-64. https://doi.org/10.5194/isprsannals-ii-3-57-2014.

"Feature-based Camera Self-Calibration" accessed Aug. 31, 2023 from https://docs.nvidia.com/drive/archive/driveworks-3.0/calibration_usecase_features.html.

Muhovic et al. "Correcting decalibration of stereo cameras in self-driving vehicles." Sensors 20.11 (2020): 3241. (Year: 2020).

Vivet et al. "Robust Filter-Based Visual Navigation Solution with Miscalibrated Bi-Monocular or Stereo Cameras." Remote Sensing 14.6 (2022): 1470. (Year: 2022).

* cited by examiner

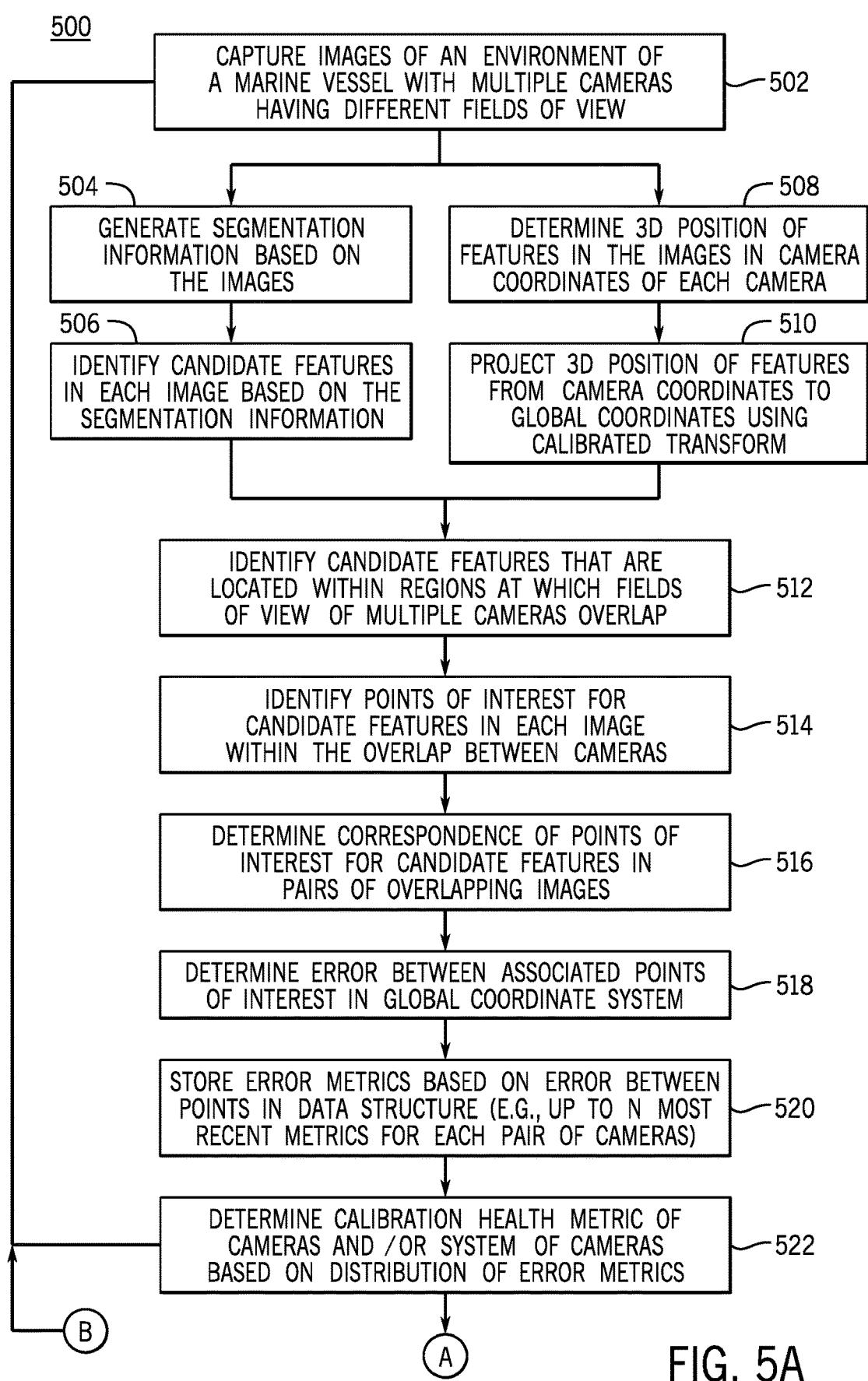

500

CAPTURE IMAGES OF AN ENVIRONMENT OF A MARINE VESSEL WITH MULTIPLE CAMERAS HAVING DIFFERENT FIELDS OF VIEW — 502

504 — GENERATE SEGMENTATION INFORMATION BASED ON THE IMAGES

508 — DETERMINE 3D POSITION OF FEATURES IN THE IMAGES IN CAMERA COORDINATES OF EACH CAMERA

506 — IDENTIFY CANDIDATE FEATURES IN EACH IMAGE BASED ON THE SEGMENTATION INFORMATION

510 — PROJECT 3D POSITION OF FEATURES FROM CAMERA COORDINATES TO GLOBAL COORDINATES USING CALIBRATED TRANSFORM

IDENTIFY CANDIDATE FEATURES THAT ARE LOCATED WITHIN REGIONS AT WHICH FIELDS OF VIEW OF MULTIPLE CAMERAS OVERLAP — 512

IDENTIFY POINTS OF INTEREST FOR CANDIDATE FEATURES IN EACH IMAGE WITHIN THE OVERLAP BETWEEN CAMERAS — 514

DETERMINE CORRESPONDENCE OF POINTS OF INTEREST FOR CANDIDATE FEATURES IN PAIRS OF OVERLAPPING IMAGES — 516

DETERMINE ERROR BETWEEN ASSOCIATED POINTS OF INTEREST IN GLOBAL COORDINATE SYSTEM — 518

STORE ERROR METRICS BASED ON ERROR BETWEEN POINTS IN DATA STRUCTURE (E.G., UP TO N MOST RECENT METRICS FOR EACH PAIR OF CAMERAS) — 520

DETERMINE CALIBRATION HEALTH METRIC OF CAMERAS AND / OR SYSTEM OF CAMERAS BASED ON DISTRIBUTION OF ERROR METRICS — 522

SYSTEMS AND METHODS FOR MONITORING CALIBRATION OF A VISION SYSTEM ON A MARINE VESSEL

FIELD

The present disclosure generally relates to systems and methods for monitoring calibration of a vision system on a marine vessel.

BACKGROUND

The following U.S. Patents are incorporated herein by reference, in entirety:

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Pat. No. 10,259,555 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. Pat. No. 11,436,927 discloses a system for proximity sensing on a marine vessel that includes a main inertial measurement unit (IMU) positioned at a main installation attitude and a main location, a first proximity sensor configured to measure proximity of objects from a first sensor location, and a first sensor IMU positioned at the first sensor location and at a first installation attitude. A sensor processor is configured to receive main IMU data from the main IMU and first IMU data from the first sensor IMU, and then determine a relative orientation transform between the main installation attitude and the first installation attitude by comparing the main IMU data and the first IMU data, and then determine a relative position transform between the main location and the first sensor location based on the relative orientation transform, the main IMU data, and the first IMU data.

SUMMARY

In accordance with some embodiments of the disclosed subject matter, a system for monitoring calibration of a vision system on a marine vessel, is provided, the system comprising:

In accordance with some embodiments of the discloses subject matter, a system for monitoring calibration of a vision system on a marine vessel is provided, the system comprising: a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system; one or more hardware processors configured to: determine three-dimensional location information associated with a first candidate feature in a three-dimensional global coordinate system based on calibration information indicative of a transform between the camera coordinate system associated with the first camera and the global coordinate system; determine that the first candidate feature is within a region of the field of view associated with the first camera that overlaps a region of a field of view associated with the second camera; determine a distance between a first three-dimensional location of a point on the first candidate feature in the global coordinate system and a second three-dimensional location of a corresponding point in the global coordinate system, wherein the first three-dimensional location is based on a three-dimensional location of the point in the camera coordinate system associated with the first camera, and the second three-dimensional location is based on a three-dimensional location of the corresponding point in a camera coordinate system associated with the second camera; add a first error metric to a data structure, wherein the first error metric is based on the distance; calculate a calibration health metric based on error metrics stored in the data structure; determine that the calibration health metric is indicative of at least a threshold degree of miscalibration; and generate a calibration alert.

In some embodiments, the one or more hardware processors are further configured to: in response to determining that the calibration health metric is indicative of at least the threshold degree of miscalibration, cause one or more autonomous navigation features of the marine vessel to be disabled.

In some embodiments, the one or more hardware processors are further configured to: receive segmentation information associated with the first camera, wherein the segmentation information includes classification information associated with features located in the field of view associated with the first camera; and identify at least the first candidate feature based on the segmentation information.

In some embodiments, the one or more hardware processors are further configured to: receive second segmentation information associated with the second camera; and determine three-dimensional location information associated with a second candidate feature in the three-dimensional global coordinate system based on calibration information indicative of a transform between the camera coordinate system associated with the second camera and the global coordinate system.

In some embodiments, the one or more hardware processors are further configured to: identify at least a second candidate feature based on the second segmentation information; and determine that the second candidate feature is within a region of the field of view associated with the second camera that overlaps a region of a field of view associated with the first camera.

In some embodiments, the segmentation information comprises a mask including a plurality of data elements, each data element of the plurality of data elements corresponding to at least one pixel, and each data element of the plurality of data elements indicating a predicted class of a plurality of classes of a feature in the image at a position corresponding to the at least one pixel.

In some embodiments, the one or more hardware processors are further configured to: receive an image from the first camera; provide the image to a machine learning model trained to classify features in the image and generate a predicted class for each feature of the image; receive, from the machine learning model, the segmentation information.

In some embodiments, each camera of the plurality of cameras comprises a stereoscopic camera.

In some embodiments, the plurality of classes includes: at least one class corresponding to a water surface; at least one class corresponding to vessels; at least one class corresponding to sky; at least one class corresponding to a dock.

In some embodiments, the one or more hardware processors are further configured to: determine that a predicted class of the first candidate feature is included in a first subset of the plurality of classes, wherein the first subset of the plurality of classes includes classes that are likely to include multiple distinct points of interest.

In some embodiments, the one or more hardware processors are further configured to: identify a plurality of points of interest on the first candidate feature, wherein the plurality of points of interest includes the point on the first candidate feature.

In some embodiments, the one or more hardware processors are further configured to: receive segmentation information associated with the first camera, wherein the segmentation information includes classification information associated with features located in the field of view associated with the first camera; and identify at least the first candidate feature based on the segmentation information identify, for each of the plurality of points of interest located within the region of the field of view associated with the first camera that overlaps the region of the field of view associated with the second camera, a corresponding point of interest on a candidate feature identified based on segmentation information associated with the second camera.

In some embodiments, the one or more hardware processors are further configured to: identify, for each of the plurality of points of interest located within the region of the field of view associated with the first camera that overlaps the region of the field of view associated with the second camera, a point of interest on the candidate feature identified based on segmentation information associated with the second camera that is closest to that point of interest in the global coordinate system.

In some embodiments, the data structure comprises a first-in-first-out data structure configured to store up to N values.

In some embodiments, the one or more hardware processors are further configured to: remove an oldest error metric from the data structure in connection with adding the first error metric to the data structure.

In some embodiments, the calibration health metric is based on up to N most recent error metric values stored in the data structure.

In some embodiments, the first error metric is based on a Euclidean distance between the first three-dimensional location and the second three-dimensional location.

In some embodiments, the first error metric is scaled based on a magnitude of an estimated location of the point on the first candidate feature.

In some embodiments, the estimated location of the point is based on a mean of the first three-dimensional location and the second three-dimensional location.

In some embodiments, the one or more hardware processors are further configured to: estimate a likelihood that a mean of a distribution of a plurality of error metrics stored in the data structure is less than a threshold; and in response to determining that the likelihood is less than a threshold, determine that the calibration health metric is indicative of at least a critical degree of miscalibration.

In some embodiments, the one or more autonomous navigation features includes guiding the marine vessel during docking.

In some embodiments, the one or more hardware processors are further configured to: determine that the calibration health metric is within a first range; and in response to determining that the calibration health metric is within the first range, generate the calibration alert.

In some embodiments, the one or more hardware processors are further configured to: determine that the calibration health metric is less than a first threshold, and greater than or equal to a second threshold.

In some embodiments, the one or more hardware processors are further configured to: determine that the calibration health metric is within a second range; and in response to determining that the calibration health metric is within the second range, determine that the calibration health metric is indicative of at least the threshold degree of miscalibration of at least one camera of the plurality of cameras.

In some embodiments, the one or more hardware processors are further configured to: determine that the calibration health metric is less than a second threshold.

In accordance with some embodiments of the disclosed subject matter, a method for monitoring calibration of a vision system on a marine vessel is provided, the method comprising: determining three-dimensional location information associated with a first candidate feature in a three-dimensional global coordinate system based on calibration information indicative of a transform between a first three-dimensional camera coordinate system associated with a first camera and the global coordinate system, wherein the first camera is configured to be mounted to the marine vessel with an associated field of view of an environment of the marine vessel, and wherein the first camera is associated with the three-dimensional camera coordinate system; determining that the first candidate feature is within a region of the field of view associated with the first camera that overlaps a region of a field of view associated with a second camera, wherein the second camera is configured to be mounted to the marine vessel with an associated field of view of an environment of the marine vessel, and wherein the second camera is associated with a second three-dimensional camera coordinate system; determining a distance between a first three-dimensional location of a point on the first candidate feature in the global coordinate system and a second three-dimensional location of a corresponding point in the global coordinate system, wherein the first three-dimensional location is based on a three-dimensional location of the point in the first camera coordinate system, and the second three-dimensional location is based on a three-dimensional location of the corresponding point in the second camera coordinate system; adding a first error metric to a data structure, wherein the first error metric is based on the distance; calculating a calibration health metric based on error metrics stored in the data structure; determining that the calibration health metric is indicative of at least a threshold degree of miscalibration; and generating a calibration alert.

Various other features, objects, and advantages of the disclosed subject matter can be more fully appreciated with reference to the following description taken together with the drawings.

BRIEF DESCRIPTION OF THE DRAWINGS

The present disclosure is described with reference to the following drawings.

FIG. 5A shows an example of a process for estimating a degree of miscalibration of a vision system on a marine vessel in accordance with some embodiments of the disclosure.

DETAILED DESCRIPTION

Figure 1:
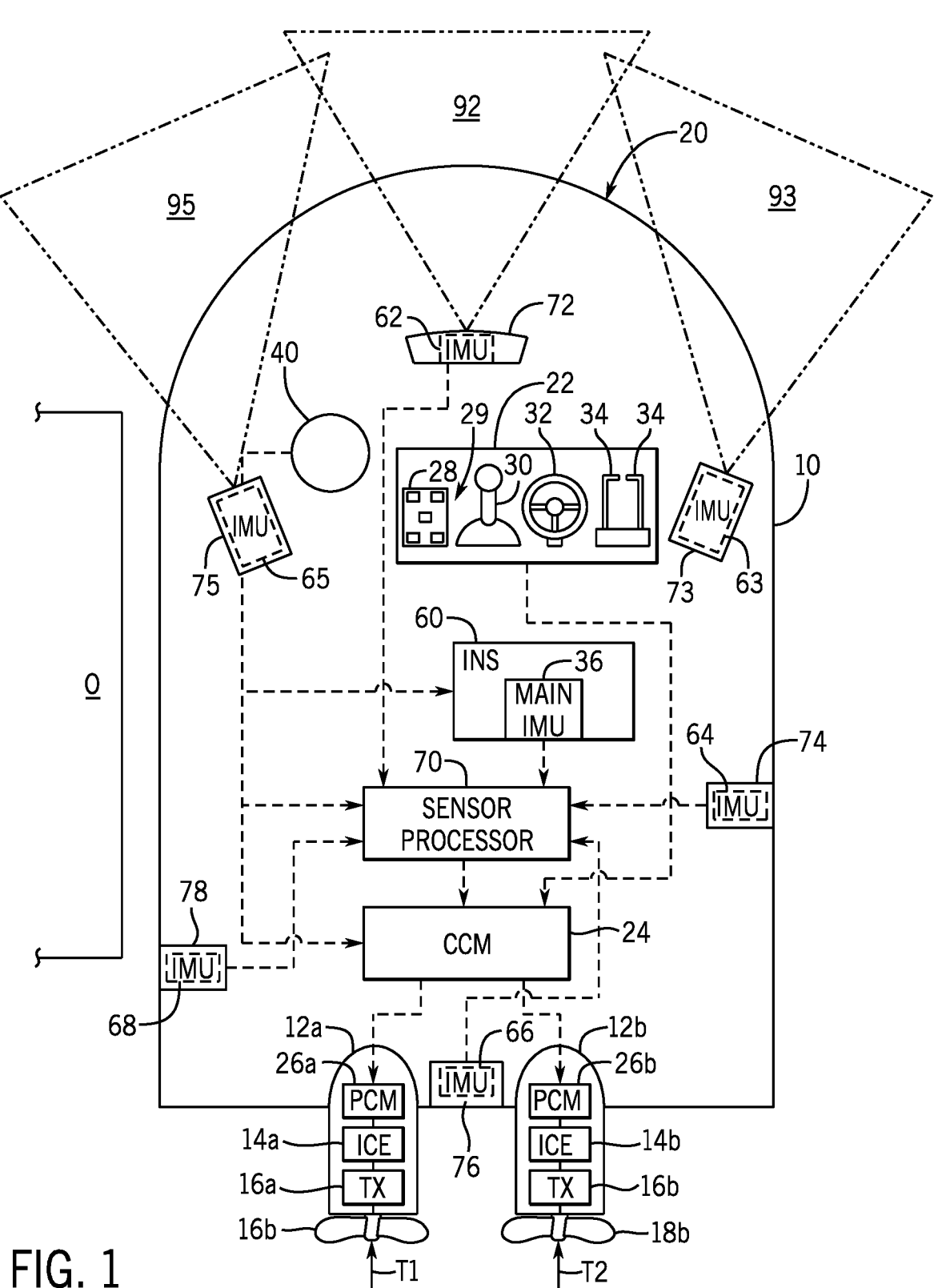
FIG. 1 shows an example of propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as for example a command control module (CCM), and with propulsion control modules (PCM) 26a, 26b associated with the respective propulsion devices 12a, 12b. Each of controller 24 and the PCMs 26a, 26b can include memory 25a and a programmable processor 25b. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as navigation control functions and/or proximity sensing calibration functions, as described in detail below.

In some embodiments, operation console 22 can include any suitable number of user input devices, such as, a keypad 28, a joystick 30, a steering wheel 32, and/or one or more throttle/shift levers 34. Each of these devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides the vessel 10, and two positioned at an angle between the bow and sides), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a water surface) that is within a field of view (e.g., FOVs 92, 93, 95, shown in FIG. 1, associated with depth sensors 72, 73, 75, respectively) of the depth sensor with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual bumper or buffer zone, autonomous navigation through areas that include other vessels and/or other obstacles, etc. The camera coordinate system can define a local reference frame for a particular camera (or other type of depth sensor), and the global coordinate system can define a reference frame that to which each camera (or other type of depth sensor) is calibrated, which can be referred to as a common reference frame, a global reference frame, or a world reference frame.

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a θ coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensors FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and the sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network where multiple devices are communicating. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, sonic sensors, and/or lidar can be used to for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1, and as described below in connection with FIG. 2). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10 (e.g., where the hull obstructs the field of view). Note also that the relevant controller, such as sensor processor 70, can selectively operate any one or more of a plurality of sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position), integrating location information from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.), can be translated to a common reference frame. To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however such information is difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electromechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system, such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, mechanisms described herein can be configured to determine whether a depth sensor 72-78 has changed its posture with respect to vessel 10 (e.g., due to an impact on or near the sensor, due to a fastener used to secure the sensor in position loosening over time, etc.). For example, in some embodiments, each depth sensor 72, 73, 74, 75, 76, 78 can be associated with a respective IMU 62, 63, 64, 65, 66, 68 provided therewith at a known orientation relative to the view angle, or coordinate system frame, of the respective sensor 72-78. Each sensor IMU 62, 63, 64, 65, 66, 68 can provide IMU data describing linear acceleration, angular acceleration, attitude, and/or heading. For example, each sensor IMU 62-68 can include a rate gyro, an accelerometer, and a magnetometer, and thus the IMU data provided can include rate gyro measurements, accelerometer measurements, and magnetometer measurements. Each sensor IMU 62-68 can be incorporated within a housing of each depth sensor device 72-78, or can be a separately-housed device (e.g., located as close as possible to the respective depth sensor 72-78) installed at a known relative orientation thereto. Alternatively, in some embodiments, IMUs 62-68 can be configured to measure fewer or more parameters. For example, each camera can be associated with one or more accelerometers used to measure acceleration in various dimensions (e.g., three dimensions), and may not include a gyroscope and/or a magnetometer.

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process depth data and/or IMU data from depth sensors 72-78, sensor IMUs 62-68, and/or main IMU 34. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU, to determine whether the sensor IMU data is inconsistent with main IMU data, etc.) and provide the interpreted IMU data to one or more other processing devices or controllers for execution of subsequent processing steps.

In some embodiments, sensor processor 70 can be programmed and/or otherwise configured to automatically perform a sensor calibration monitoring process, in which sensor processor 70 can estimate an amount of error between corresponding points on a feature that are calculated by two different depth sensors that both include the feature in the respective FOV associated with the depth sensor. Additionally, in some embodiments, sensor processor 70 can be configured to calculate a calibration health metric for a pair of depth sensors based on a distribution of the error metrics. For example, as described below in connection with FIGS. 5A, 5B, and 7, as the mean error between two depth sensors increases (e.g., based on the mean of the distribution increasing), sensor processor 70 can estimate a likelihood of the two depth sensors being substantially miscalibrated to be higher. In such an example, two depth sensors can gradually become less well calibrated over time, e.g., due to a gradual change in posture, a gradual change in device intrinsic properties, temperature fluctuations, etc. As another example, if the distribution of the error becomes bi-modal, sensor processor 70 can determine that a large change in depth sensor posture may have occurred, which may be indicative of a relatively high likelihood of the two depth sensors being substantially miscalibrated. In some embodiments, sensor processor (and/or another controller, such as CCM 24), can cause use of autonomous navigation features to be disabled or otherwise restricted in response to determining that the likelihood of a substantial degree of miscalibration is relatively high.

Figure 2:
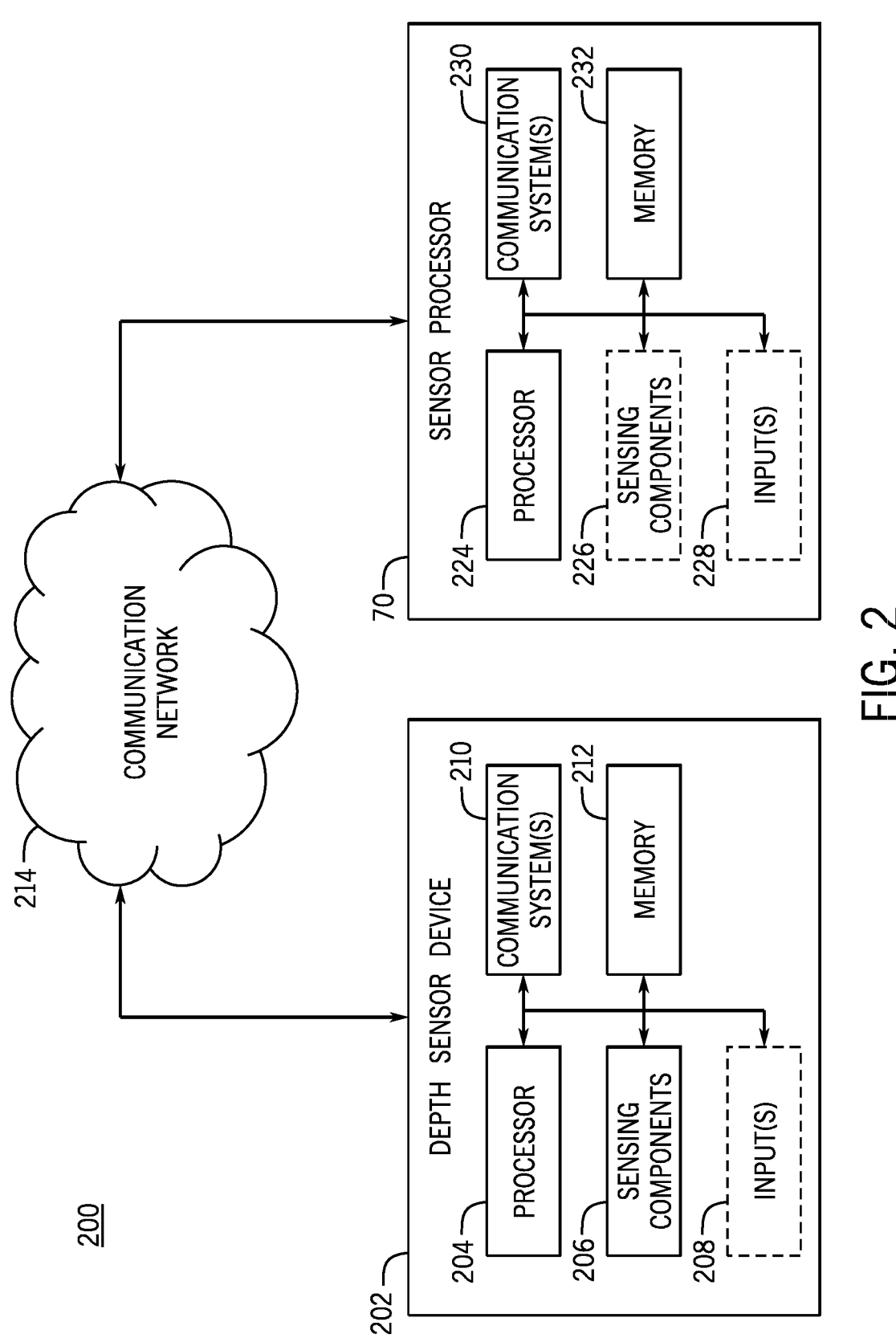
FIG. 2 shows an example of a system for hardware that can be used to implement a sensor device and sensor processor in accordance with some embodiments of the disclosure.

FIG. 2 shows an example of hardware 200 that can be used to implement a depth sensor device 202 and sensor processor 70 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of the depth sensor device 202. In some embodiments, depth sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. As yet another example, depth sensor device 202 can be implemented as one or more sound-based devices (e.g., one or more sonar systems, etc.) that include components that facilitate three-dimensional characterization of a region of an environment. As still another example, depth sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, depth sensor device 202 can omit inputs (e.g., where depth sensor device is an embedded device, or where depth sensor device is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for estimating a degree of miscalibration of a portion of a vision system and/or monitoring calibration health of a vision system, such as processes described below in connection with FIGS. 5A to 11, etc.

In some embodiments, depth sensor device 202 can include a display (not shown), can include any suitable display devices, such as a computer monitor, a touchscreen, a television, etc.

In some embodiments, communication network 214 can be any suitable communication network or combination of communication networks. For example, communication network 214 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis to CCM 24, and CCM 24 can use the results to assist with autonomous control and/or advanced operator assistance control.

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze depth information received from depth sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, and the like. In some embodiments, memory 232 can have encoded thereon a computer program for controlling operation of sensor processor 70. In such embodiments, processor 224 can execute at least a portion of the computer analyze depth information, to identify and/or classify one or more objects and/or other features in a scene based on the depth information and/or image information, to receive information from depth sensor device 202, to execute at least a portion of a process for estimating a degree of miscalibration of a portion of a vision system and/or monitoring calibration health of a vision system, such as processes described below in connection with FIGS. 5A to 11, etc.

Figure 3:
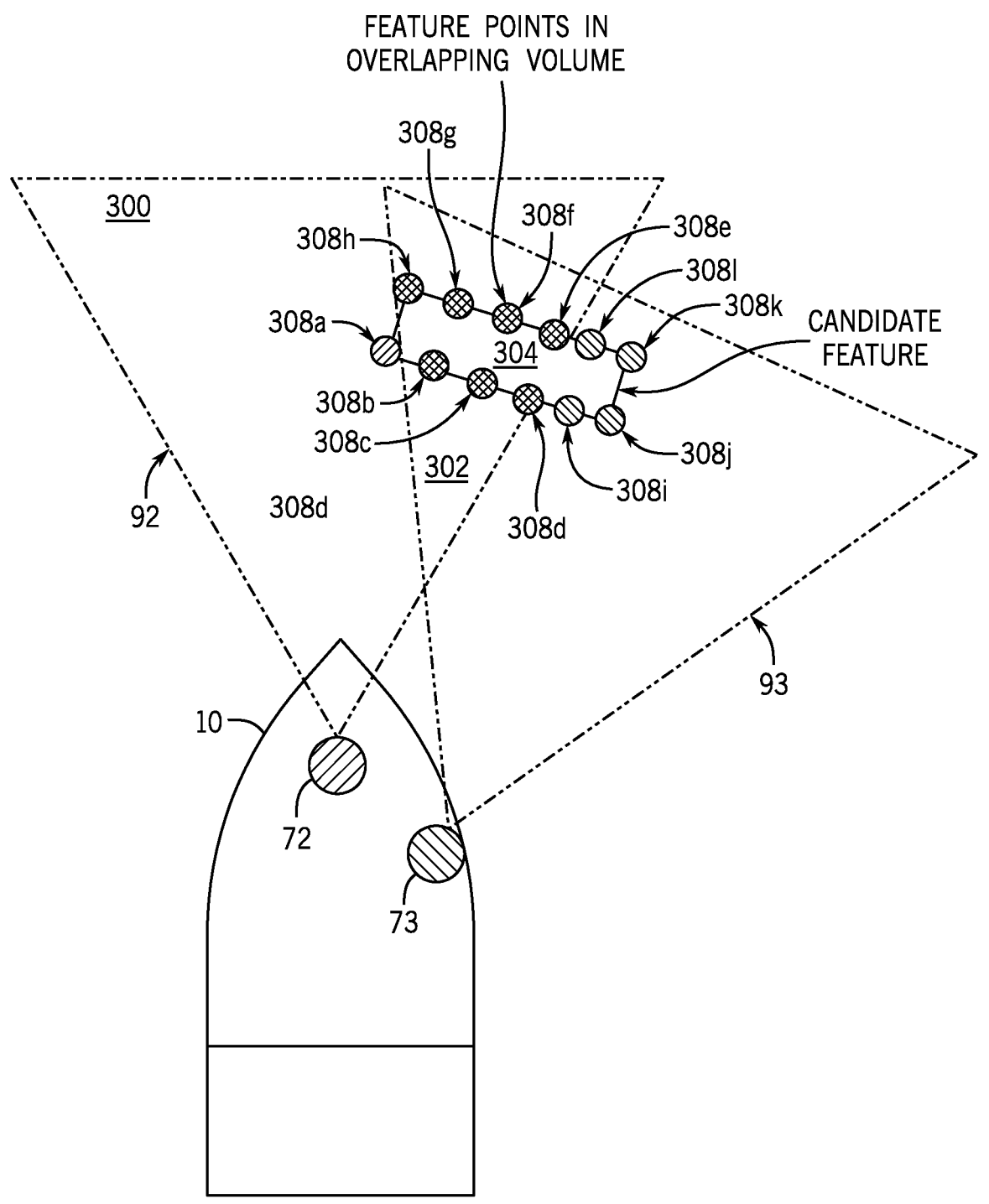
FIG. 3 shows an example of a marine environment including a marine vessel including a calibrated vision system implemented in accordance with some embodiments of the disclosure, and an object in the marine environment.

FIG. 3 shows an example of a marine environment 300 including marine vessel 10 including a calibrated vision system implemented in accordance with some embodiments of the disclosed subject matter, and an object in the marine environment. As shown in FIG. 3, two depth sensors (e.g., depth sensor 72 and depth sensor 73) of a calibrated vision system of vessel 10 can have fields of view 92 and 93, respectively, that include some overlapping region 302 that falls within both fields of view. Each field of view can represent a 3D region of environment 300 that can potentially be characterized by depth sensors 72 and 73, and overlapping region 302 can represent a 3D region of environment 300 that can potentially be characterized by both depth sensors 72 and 73. As shown in FIG. 3, an object 304 falls partially within overlapping region 302. As described below, the vision system can identify features that are expected to be within an overlapping portion of fields of view of two (or more) depth sensors. As shown in FIG. 3, object 304 includes various points of interest 308*a*-308*l* (e.g., relatively uniquely identifiable points, such as corners). Points of interest (e.g., points 308*b*-308*h*) are present within both FOVs, and others are present in only one FOV (e.g., point 308*a* is only present in FOV 92, and points 308*i*-308*l* are only present in FOV 93).

Figure 4:
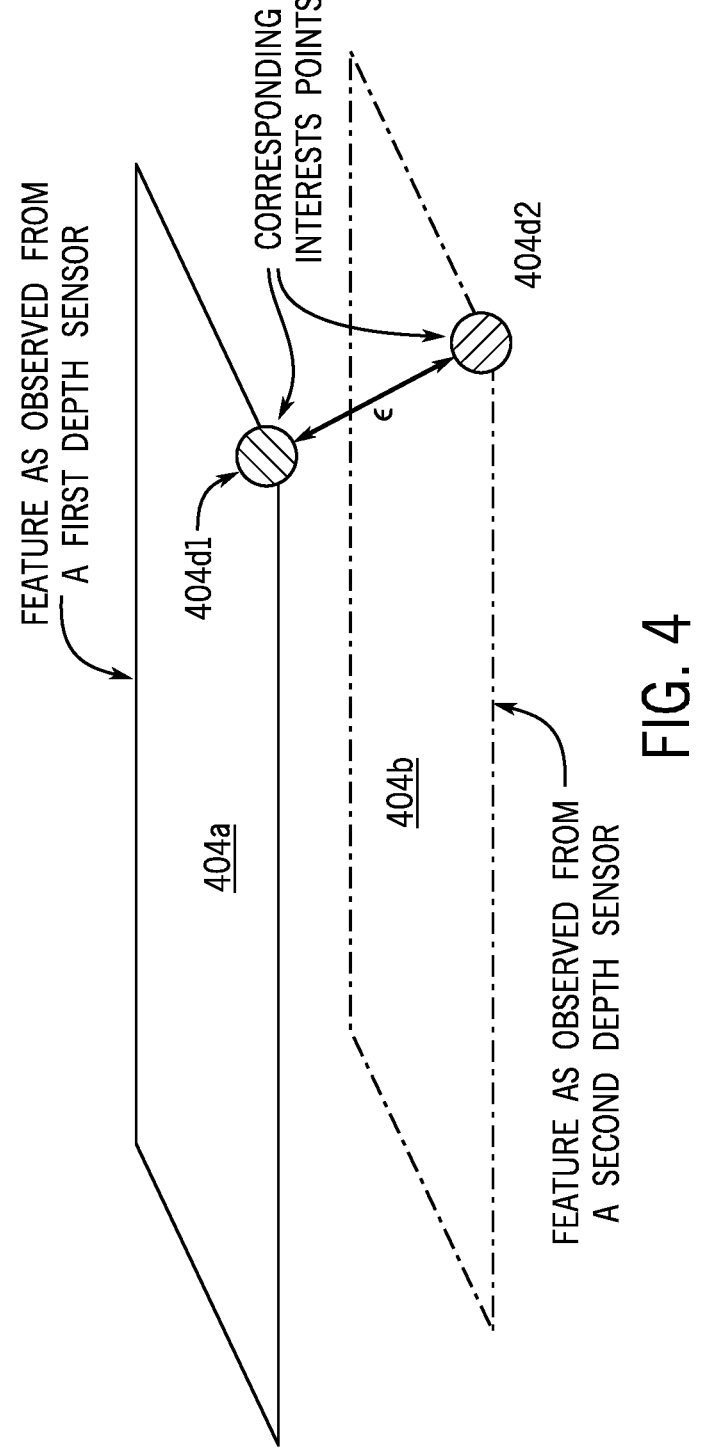
FIG. 4 shows an example of positions of a feature projected into a global coordinate system using calibration information based on position information in the camera coordinate systems of a pair of cameras.

FIG. 4 shows an example of positions of a feature projected into a global coordinate system using calibration information based on position information in the camera coordinate systems of a pair of cameras. In the example of FIG. 4, a feature (e.g., 304) detected by multiple depth sensors (e.g., depth sensors 72 and 73), can be projected as feature 404*a* based on data from the first sensor (e.g., depth sensor 72), and feature 404*b* based on data from the second sensor (e.g., depth sensor 73). As described above, each depth sensor that detects the presence of a feature can determine the 3D location of various points on the feature, and those 3D locations can be projected into a common reference frame (e.g., defined by a global coordinate system with respect to vessel 10) using transforms determined during a calibration process. As shown in FIG. 4, when the same points from a feature are projected into the common reference frame, the points may not project to the exact same locations (e.g., point 408*d*1 on feature 404*a* and point 408*d*2 on feature 404*b* correspond to the same point, but are offset in the common reference frame). For example, this may be relatively small differences (e.g., on the order of 15 cm of translation along each axis for a point about 10 m from the depth sensor, which can correspond to a rotational difference of about one degree within the depth sensor FOV, or a sphere having a radius of 15 cm around the true location of the object) due to limitations on the level of precision that can be achieved with calibration processes of each individual depth sensor and/or the entire vision system. As another example, this difference may be relatively large (e.g., on the order of several dozen cm, such as 90 cm of translation along each axis for a point about 10 m from the depth sensor, which can correspond to a rotational difference of about five degrees). As described below, in some embodiments, mechanisms described herein can determine an error metric based on the distance between a location of a point determined by one depth sensor, and the location of that point determined by another depth sensor with an overlapping field of view. For example, a controller (e.g., sensor processor 70) can calculate a Euclidean distance $\epsilon_i$ between corresponding interest points. As another example, a controller (e.g., sensor processor 70) can calculate an L1-norm (sometimes referred to as Manhattan distance) between corresponding interest points.

Figure 5B:
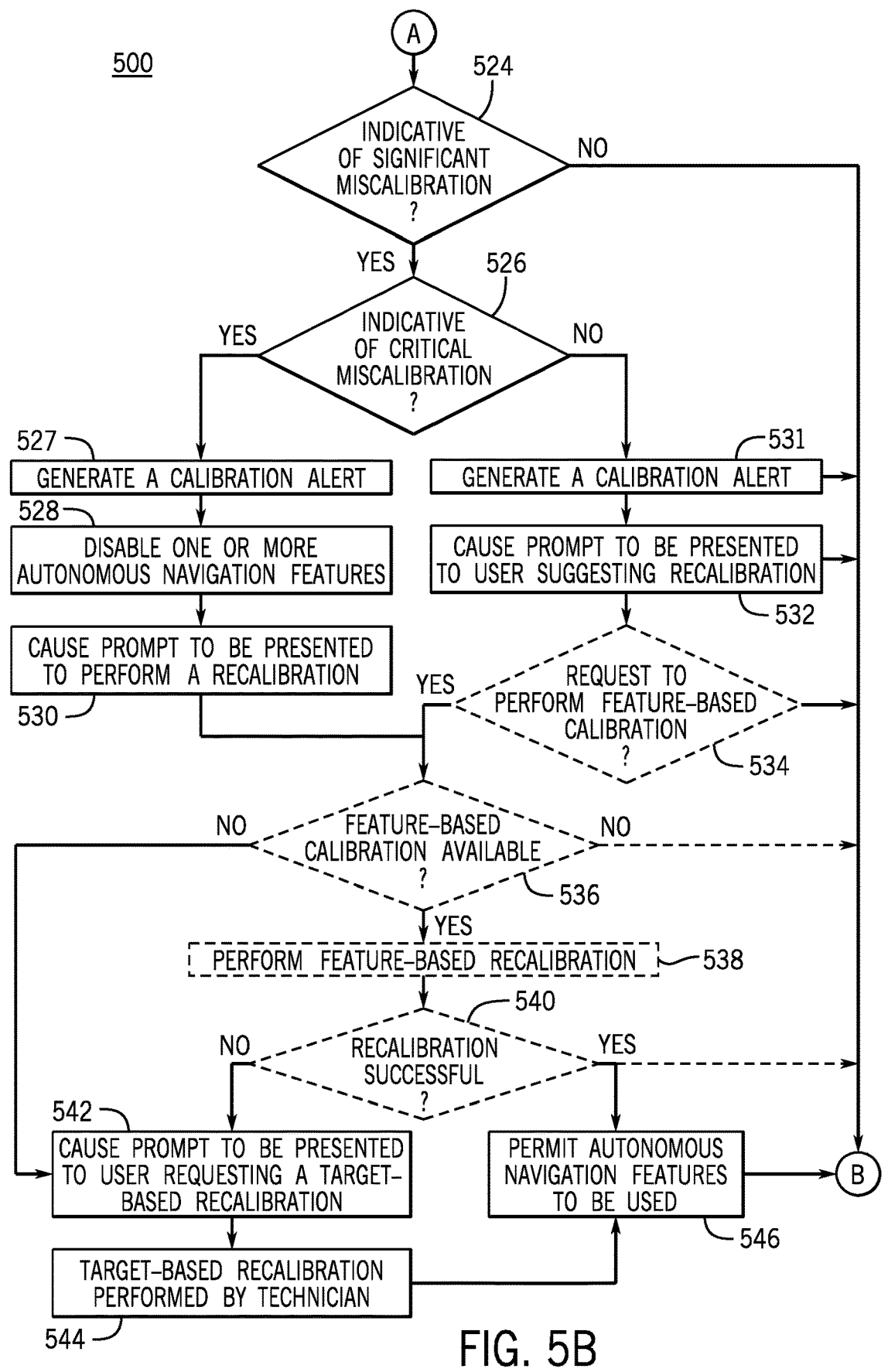
FIG. 5B shows an example of another portion of the process for estimating a degree of miscalibration of a vision system on a marine vessel in accordance with some embodiments of the disclosure.

FIGS. 5A and 5B show an example of a process 500 for estimating a degree of miscalibration of a vision system on a marine vessel in accordance with some embodiments of the disclosed subject matter.

At 502, process 500 can capture images of an environment of a marine vessel with multiple cameras having different fields of view. In some embodiments, process 500 can include capturing image data using any suitable type of camera(s), and/or any suitable number of cameras. For example, as described above, in some embodiments, process 500 can include capturing images with stereoscopic cameras, structured light cameras, continuous-wave time-of-flight cameras, direct time-of-flight cameras, etc. In some embodiments, cameras used to capture image data at 502 can capture information in various portions of the electromagnetic spectrum. For example, cameras used to capture image data at 502 can capture information using light in the visible spectrum (e.g., with wavelengths in a range of about 380 to 700 nanometers (nm)). As another example, cameras used to capture image data at 502 can capture information using light outside the visible spectrum (e.g., in the infrared portion of the spectrum, such as near-infrared, in the ultraviolet portion of the spectrum).

In some embodiments, process 500 can capture 3D information of an environment of a marine vessel with multiple depth sensors having different fields of view, and that use a non-imaging technology. For example, process 500 can capture 3D information of an environment of a marine vessel using lidar. As another example, process 500 can capture 3D information of an environment of a marine vessel using radar. As yet another example, process 500 can capture 3D information of an environment of a marine vessel using sonar.

Additionally or alternatively, in some embodiments, process 500 can include capturing one or more images with a non-depth sensing camera, such as a conventional two-dimensional digital camera (e.g., that outputs RGB images).

In some embodiments, the images captured at 502 can be images that are captured for an explicit purpose other than estimating a degree of miscalibration of a vision system on a marine vessel. For example, the images can be captured to perform machine vision processes (e.g., to facilitate autonomous navigation, obstacle avoidance, etc.). Accordingly, process 500 can leverage images (and/or other data) captured for another purpose and can utilize the images to estimate a degree of miscalibration of the vision system on the marine vessel (e.g., reducing computational resources dedicated to monitoring calibration health).

At 504, process 500 can generate segmentation information based on one of more of the images captured at 502. As described below in connection with FIG. 13, in some embodiments, the segmentation information can include classification information that indicates which of a set of classes different portions of the image are most likely to correspond. In some embodiments, the set of classes can include classes that are relatively likely for the vessel to encounter (e.g., in a marine environment). For example, the set of classes can include one or more classes of bodies of water, such as one or more broad class of water feature (e.g., water surface), and/or multiple more specific classes of water features (e.g., river, lake, sea, ocean, deep water, shallow water, etc.). As another example, the set of classes can include one or more classes of structure, such as one or more broad class of structural feature (e.g., structure), and/or multiple more specific classes of structural features (e.g., dock, bridge, building, sea wall or more specific classes such as concrete sea wall or rock sea wall, etc.). As yet another example, the set of classes can include one or more classes of vessel, such as one or more broad class of vessel feature (e.g., vessel, boat, motor vehicle, etc.), and/or multiple more specific classes of vessel features (e.g., boat, large boat, small boat, personal watercraft or more specific classes such as jet ski, sail boat, human-powered watercraft or more specific classes such as: canoe; kayak; or standup paddle board, etc.). In such an example, the segmentation information can include a class corresponding to features of the vessel associated with the camera(s) that captures the image (e.g., an ego vessel class). As still another example, the set of classes can include one or more classes of vegetation, such as one or more broad class of vegetation feature (e.g., vegetation, etc.), and/or multiple more specific classes of vegetation features (e.g., trees, brush, algae, etc.). As a further example, the set of classes can include one or more classes of animal, such as one or more broad class of animal feature (e.g., animal), and/or multiple more specific classes of vegetation features (e.g., person, dog, marine animal, etc.). As another further example, the set of classes can include one or more classes of navigation aid, such as one or more broad class of navigation aid feature (e.g., navigation aid), and/or multiple more specific classes of navigation aid features (e.g., channel marker, buoy, sign, specific types of signs, etc.). As yet another further example, the set of classes can include one or more classes of open space and/or land, such as one or more broad class of sky feature (e.g., sky) and/or land feature (e.g., land), and/or multiple more specific classes of sky features (e.g., open sky, clouds, types of clouds, etc.) and/or specific classes of land (e.g., sand, beach, sandy beach, rocky beach, soil, grass, rock, bluff, etc.). As still another further example, the set of classes can include one or more classes of debris, such as one or more broad class of debris feature (e.g., debris), and/or multiple more specific classes of debris features that are often found floating in water (e.g., log, trash, algae, etc.). In some embodiments, the segmentation information can include a class corresponding to calibration target features. For example, the trained machine learning model can be trained to classify calibration targets (e.g., having a predetermined shape and/or pattern) as a separate class (e.g., rather than classifying the targets in another class, such as signs or ego vessel for targets that are mounted to and/or integrated into the vessel).

In some embodiments, process 500 can generate the segmentation information using any suitable technique or combination of techniques, and the segmentation information can be in any suitable format. For example, process 500 can provide one or more images to a trained machine learning model that was trained to generate segmentation information classifying regions (e.g., each corresponding to one or more pixels of the image) as most likely belonging to a certain class and/or a probability of the region corresponding to each of various classes. In such an example, process 500 can receive the segmentation information from the trained machine learning model.

In some embodiments, the segmentation information can be formatted using any suitable format. For example, the segmentation information can be formatted as a set of masks, each corresponding to a particular class, where a particular value (e.g., a binary 1) indicates that the class is likely present at a region (e.g., a pixel or group of pixels), and another value (e.g., a binary 0) indicates that the class is likely not present at a region. In such an example, the segmentation information can be formatted as a matrix having rows and columns equal to the rows and columns of the image provided to the trained machine learning model. As another example, the segmentation information can be formatted as a set of masks, each corresponding to a particular class, where a value (e.g., in a range of 0 and 1) indicates a likelihood that the class is present at a region (e.g., a pixel or group of pixels). As yet another example, the segmentation information can be formatted as an image in which a color at each pixel indicates a classification of the pixel (e.g., "sky" can be encoded with RGB brightness values (r,g,b) using an eight bit scale, for example as rgb=(0,0,255)). In such an example, the pixel may or may not be associated with a confidence value (e.g., class can be encoded using one or more of the red, green, and blue channels, and confidence can be encoded in a channel not used to encode class, which may or may not be a color channel). Note that the image captured by the camera at 502 may have a different number of rows and/or columns than the image provided to the trained machine learning model. The image received from the camera may have more pixels (e.g., it may be a higher resolution) than the image provided to the trained machine learning model, as the trained machine learning model may require an image with a particular number of pixels as input, and/or a particular number of color channels (e.g., a grayscale image with a single channel, a color image with multiple color channels, etc.). In some embodiments, the machine learning model can be trained to utilize depth information (e.g., in a depth channel of the image provided to the machine learning model). Additionally or alternatively, in some embodiments, depth information can be used to supplement the segmentation information (e.g., to check, confirm, and/or refine the segmentation to confirm that the object has dimensions consistent with the class indicated in the segmentation information).

In some embodiments, the image provided to the machine learning model at 504 can be an image captured by a camera at 502 that is also used to generate depth information (e.g., as described below in connection with 508). As another example, the image provided to the machine learning model at 504 can be an image captured by a camera at 502 that is not used to generate depth information. In such an example, the image can be an image from a camera that is co-located with a depth sensor used to generate depth information and having a field of view that encompasses at least a portion of the field of view of the depth sensor.

In some embodiments, the segmentation information can be formatted as semantic segmentation information in which all regions that belong to a class are labeled with a single label (e.g., all boats are labeled "boat," all people are labeled "person," etc.) corresponding to the class regardless of whether they are contiguous or are likely to represent a single instance of the class or multiple instances of the class.

Alternatively, in some embodiments, the segmentation information can be formatted as instance segmentation information in which regions that belong to a class are labeled with multiple labels corresponding to instances of the class (e.g., different boats are labeled with different labels, such as "boat 1," "boat 2," etc.) that indicate demarcations between instances of the class.

In some embodiments, one or more additional trained machine learning models (and/or other computer vision techniques) can be used to provide supplemental information that can be used to label the segmentation information, or can be used in lieu of the segmentation information. For example, if the trained machine learning model identifies a region of an image as corresponding to a sign, that portion of the image can be provided to a trained machine learning model that is trained to classify the sign as belonging to a particular class of sign (e.g., based on object classification techniques, based on optical character recognition techniques, etc.). As another example, process 500 can use one or more trained machine learning models that generate object detection information (e.g., as bounding boxes for a portion of an image including a particular class of object) in lieu of, or in addition to, the segmentation information.

As another example, process 500 can obtain classification information from a database or map, and can use such classification information in addition to, or in lieu of, the segmentation information. In such an example, the database or map can include certain relatively persistent features of the environment (e.g., structural feature, water features, navigation aid features, land features, etc.). Such information can be used to supplement and/or confirm the segmentation information. Alternatively, such information can be used to classify objects in an environment around the vessel based on the location of the vessel and the location of the features in the database or map.

As yet another example, process 500 can identify points of interest for an entire image or portions of an image that correspond to an overlapping region of a FOV (e.g., utilizing techniques described below in connection with 514 to identify points of interest) based on one of more of the images captured at 502. In such an example, one or more feature matching techniques can be used to determine correspondence between points of interest identified from different images captured by different depth sensors. Note that utilizing segmentation information to identify candidate features and identifying points of interest based on the data corresponding to the points of interest can be advantageous as it may utilize fewer computation resources.

At 506, process 500 can identify candidate features in each image based on the segmentation information. In some embodiments, the candidate features can be features that likely to have a sufficient number of points of interest to perform meaningful calibration error estimates. For example, certain features, such as a portion(s) of the vessel associated with the depth sensors, certain signs or other navigation aids that are likely to have consistent and similar geometry, docks, other boats, structures, etc., that are likely to have sufficient points of interest to perform meaningful error calculations.

In some embodiments, process 500 can identify features that belong in one or more particular classes as candidate features, and can disregard features that belong in one or more other particular classes as potential candidate features. For example, process 500 can identify features classified as belong to particular classes (e.g., calibration targets, portions of the ego vessel, navigation aids having consistent geometry, classes that are likely to have sufficient interest points but have unknown geometry, such as docks, buildings, other structures, navigation aids of unknown geometry, boats, people, etc.) as candidate features, and can disregard features belonging to certain other classes (e.g., water features, sky, vegetation, land, etc.).

In some embodiments, process 500 can add features identified as candidate features for a particular depth sensor (e.g., a particular depth camera) to a data structure associated with the depth sensor. For example, process 500 can add identifying information of a candidate feature (e.g., the class to which the feature belongs, the instance of the feature, information identifying where in the image the candidate feature is located, the image data corresponding to the candidate feature, 3D location information of the candidate feature, etc.) to a queue associated with the depth sensor.

In some embodiments, each depth sensor can be associated with a queue (or other data structure) of candidate features. As described below, the queue (or other data structure) can be used to identify features that are likely to be suitable for performing calibration error estimates (e.g., candidate features that are located in overlapping regions of fields of view of a pair of cameras).

At 508, process 500 can determine 3D position information of features in the image(s) (or other data) captured at 502 using any suitable technique or combination of techniques in a coordinate system associated with the depth sensor associated with the image that was captured. For example, process 500 can determine the 3D location of features captured by a stereoscopic camera using conventional stereoscopic camera depth estimation technique and a coordinate system associated with the stereoscopic camera. As another example, process 500 can determine the 3D location of features in a field of view of a lidar using lidar techniques (e.g., a time-of-flight of a laser pulse directed at a particular portion of the FOV), and can correlate the positions with objects in an image (e.g., an image used to generate segmentation information) based on a relationship between the lidar and a camera (e.g., an RGB camera, a depth camera).

In some embodiments, process 500 can associate a 3D position determined at 508 in camera coordinates with pixels of the image(s) for which a depth was determined. For example, process 500 can generate depth maps corresponding to each image (e.g., both images in a pair of images captured by a stereoscopic camera), in which the depth at each pixel is given in camera coordinates. As another example, process 500 can generate a point cloud corresponding to each scene depicted in the image (e.g., derived from both images in a pair of images captured by a stereoscopic camera).

In some embodiments, the 3D position determined at 508 can be based on intrinsic parameters associated with the depth sensor (e.g., based on characteristics of the sensing components of the depth sensor, such as a lens(es), image sensor, etc., of a depth camera) determined via a depth sensor calibration process. In some embodiments, the calibration of each depth sensor can be performed prior to installation of the depth sensor onto a vessel (e.g., vessel 10).

At 510, process 500 can project 3D position of features determined at 508 from the camera coordinates to global coordinates using a calibrated transform associated with the depth sensor(s) used to generate the 3D position information in the camera coordinates. As described above, in some embodiments, a calibration process can be performed after the depth sensors are installed on a vessel (e.g., vessel 10), which can be used to determine a set of transforms that can be used to convert a location from a local coordinate system used by a particular depth sensor (e.g., a camera coordinate system) to the corresponding location in a global coordinate system (e.g., a coordinate system common to vessel 10). In such an example, the vision system calibration can be based on parameters that are external to the depth sensor (sometimes referred to as extrinsic parameters), such as the position and orientation at which the depth sensor is mounted relative to the vessel and/or other depth sensors.

In some embodiments, projection of features from camera coordinates to global coordinates at 510 can be limited to features that have been identified as candidate features at 506.

At 512, process 500 can identify candidate features (e.g., from the queue of candidate features identified at 506) that are located within regions of the environment at which fields of view of multiple depth sensors overlap. In some embodiments, process 500 can use information about the 3D position of the candidate features (e.g., by correlating the 3D position information from 510 and the segmentation (or other information) generated at 504. Additionally, process 500 can use information about a volume in the environment that falls within the field of view of each depth sensor. For example, process 500 can utilize at least a portion of process 700 and/or process 800 described below in connection with FIGS. 7 and 8, respectively, to identify candidate features that are located in overlapping fields of view.

In some embodiments, process 500 can evaluate, for candidate features in a queue associated with a particular depth sensor, whether the candidate feature is at least partially within a 3D volume of the environment encompassed by any other depth sensor. In some embodiments, process 500 can retrieve information from memory (e.g., memory 232 or memory 212) that can be used to determine whether a particular 3D point is within a region of the environment that is expected to fall within the FOV of multiple depth sensors. Such information can be generated during a calibration process, and can be stored in memory (e.g., as coordinates of a 3D shape in the global coordinate system). Additionally or alternatively, in some embodiments, each depth sensor FOV can be associated with information indicating which portion of that FOV is expected to be overlapped by another depth sensors FOV. For example, the information indicative of an intersection of one or more other depth sensor FOV can be stored in memory associated with each depth sensor (e.g., as coordinates of a 3D shape in the global coordinate system).

In some embodiments, if process 500 determines that a feature in a queue of candidate features is at least partially within a portion of the field of view that overlaps with a portion of a field of view associated with another depth sensor, process 500 can add the candidate feature to a queue (or other suitable data structure) of features potentially overlapping with the other depth sensor. In some embodiments, each depth sensor can be associated with a queue of candidate features and one or more queues of candidate features potentially overlapping with another depth sensor (e.g., one queue of candidate features potentially overlapping with another depth sensor for each depth sensor that has an overlapping field of view).

In some embodiments, process 500 can use any suitable technique or combination of techniques to identify candidate features that are likely to appear in the location information from multiple depth sensors (e.g., candidate features with corresponding points in data from two or more depth sensors). For example, as described below in connection with FIG. 8, if a candidate feature of a particular class (e.g., ego vessel, navigation aid, dock, building, boat, person, etc.), appears in a queue of candidate features potentially overlapping with another depth sensor for two sensors that overlap, process 500 can determine that the candidate features likely correspond to one another.

In some embodiments, process 500 can identify candidate features that are not located within regions at which fields of view overlap, but which have a position that is expected to be fixed with respect to the depth sensor. For example, fixed portions of the ego vessel can be identified as candidate features. In such an example, such a feature can be added to a separate queue of features that are solely within the field of view of a single depth sensor. Such candidate features can be analyzed separately, such as by determining an error between points on the candidate feature from a current image to points on the candidate feature identified from a previous image (e.g., an image captured during or soon after a calibration procedure was performed). Otherwise the analysis can be similar with the calibration health being indicative of how closely the current points are to the corresponding points at the time of calibration. In some embodiments, interest points from the image captured at the time of calibration can be stored (e.g., information indicating the 3D location of the points in the global coordinate system, rather than storing the image itself and recalculating the interest points).

At 514, process 500 can identify points of interest for candidate features in each image within the overlap between FOVs of the depth sensors. In some embodiments, process 500 can use any suitable technique or combination of techniques to identify points of interest from the candidate features that are likely to be in both fields of view. For example, process 500 can use a corner finding, edge finding, and/or blob detection technique to identify potential points of interest from 2D image data, a depth map, and/or point cloud data associated with the candidate feature. In a more particular example, process 500 can identify points of interest from 2D image data using techniques such as: the Harris corner detector; Scale Invariant Feature Transform (SIFT); Speeded Up Robust Feature (SURF); Features from Accelerated Segment Test (FAST); Oriented FAST and Rotated BRIEF (ORB).

In another more particular example, process 500 can identify points of interest from 3D data (e.g., RGBD data, point cloud data); such as the 3D Harris operator which can be used to detect corners in the point cloud data; ThrIFT (a 3D extension based on SIFT); NARF, 3D-SIFT, etc.

As described above in connection with FIG. 3, process 500 can determine points of interest for the object 304 that has been identified as a candidate feature from each depth sensor separately, such that (at least) two sets of points of interest in the overlapping volume (e.g., corresponding to points 308b-308h in FIG. 3) are identified for what is likely to be the same real-world object.

In some embodiments, process 500 can filter the points of interest to remove points that are determined to be outside of a likely region of overlap between the two (or more) depth sensors (e.g., based on a 3D shape of the overlapping region that is stored in memory). Note that as the field of view may change over time (e.g., leading to a greater degree of miscalibration), such filtering may include points that are no longer in an overlapping region and/or exclude points are now in an overlapping region. This can lead to errors that appear larger than would be expected from the degree of miscalibration between the pair of depth sensors. As described below, such errors can be on the right side of a distribution of errors, impacting the probability that the miscalibration is over a threshold. In some embodiments, filtering of points of interest can be omitted (e.g., when using a correspondence approach to find corresponding points).

In some embodiments, a shape of an overlapping region can be modified to mitigate errors that are likely to be caused by the depth sensors. For example, errors that are caused by stereo camera depth sensors (e.g., which can experience exponential increases in depth error with distance) can be mitigated by specifying a maximum range of the overlapping region, such that objects beyond that range from the depth sensors are not identified as being in the overlapping region.

At 516, process 500 can determine a correspondence between points of interest for candidate features in pairs of overlapping depth sensor data using any suitable technique or combination of techniques. For example (e.g., as described below in connection with process 900 of FIG. 9), process 500 can identify, for each point in a first set of points of interest for a candidate feature from a first depth sensor of a pair of depth sensors, a nearest point (in the global coordinate system) of a second set of points of interest for the matching candidate feature from a second depth sensor of the pair of depth sensors. Note that this may result in the same point being used to calculate multiple error metrics, as a single point in the second set of points of interest may be the closest point to multiple points in the first set of points of interest. This can lead to errors that appear larger than would be expected from the current degree of miscalibration between the pair of depth sensors. As described below, such errors can be on the right side of a distribution of errors, impacting the probability that the miscalibration is over a threshold.

As another example, (e.g., as described below in connection with process 1000 of FIG. 10), process 500 can identify a correspondence between candidate feature points of interest from two depth sensors using any suitable technique or combination of techniques.

For example, process 500 can determine correspondence between two candidate features that are classified as objects with a known/consistent geometry (e.g., certain navigation aids, such as signs). In such an example, process 500 can use the known geometry to determine a correspondence between points In a more particular example, the known relationship between corners of a sign can be used to match the corners (or other points of interest with known geometry) of the sign in a one-to-one correspondence (e.g., matching the bottom left corner in the data captured by the first camera to the bottom left corner in the data captured by the second camera).

As another example, feature matching techniques can be used to match points of interest. In more particular example, SIFT, SURF, and ORB techniques associate each interest point with a feature descriptor that encodes information around the point (e.g., as a sort of "fingerprint" for the point of interest). Feature matching can use the encoded information to identify which interest points in the two datasets have the most similar "fingerprint."

As yet another example, process 500 can attempt to determine a correspondence that results in the lowest average distance between the two sets of points of interest. In a more particular example, process 500 can use NARF or 3D-SIFT techniques to attempt to find a correspondence between two sets of depth points (e.g., point cloud points).

At 518, process 500 can calculate an error $\epsilon_i$ (e.g., an unscaled error metric) between associated points of interest (e.g., corresponding points found at 516) in the global coordinate system using any suitable technique or combination of techniques. For example, process 500 can find a Euclidean distance between the associated points.

In some embodiments, process 500 can generate a scaled error $s_i$ (e.g., a scaled error metric) based on an estimated distance to a true location of the feature interest point that both points of interest are expected to correspond to (e.g., from a common point in the global coordinate system, such as the origin, or a particular point on the vessel such as the COG or COR, which may also correspond to the origin of the coordinate system). In some embodiments, the true location of the point can be estimated based on an average position P of the two points. For example, the unscaled error can be scaled by the magnitude of the average position P, using the following relationship $$S_i = \frac{\epsilon_i}{|\bar{p}|_2}.$$

In some embodiments, scaling can be applied to facilitate use of a single threshold for an acceptable degree of calibration error.

Additionally or alternatively, in some embodiments, the threshold can be defined as a function of point location, and such threshold values can be looked up in a table. As described above, the measurement error of some depth sensors can be expected to increase with axial distance from the depth sensor. In some embodiments, different error thresholds can be defined for different distances (e.g., a first threshold from 0-6 m, a second higher threshold for 6-10 m, etc.). For example, an error threshold of 0.5 m can be set for points that are in a range of 6-10 m from a depth sensor. In such embodiments, error values can be grouped into different distributions based on the distance of the point(s) from the depth sensor(s). For example, if a pair of points both fall within a range of 6-10 m from the respective depth sensors, the error value calculated from those points can be grouped with the distribution associated with the 6-10 m range (e.g., the error value can be placed into the distribution associated with the 6-10 m range). As another example, if either point in a pair of points both falls within a range of 6-10 m from the respective depth sensors, the error value calculated from those points can be grouped with the distribution associated with the (e.g., the error value can be placed into the distribution associated with the 6-10 m range even if one of the points is closer to the depth sensor that captured the point). As yet another example, an average distance of the points from the depth sensors can be calculated, and the average distance can be used to determine a range in which to place error calculation. In a more particular example, an average origin can be calculated for the pair of depth cameras, such as if P1 is a location of a first depth sensor in the global coordinate system, and P2 is a location of a second depth sensor in the global coordinate system, an average origin can be calculated as $$\frac{P1 + P2}{2}$$

can be used to determine a distance. Additionally, in such a more particular example, an average location of the points (e.g., an estimated true location of the corresponding points) can be used to determine the distance. In such an example, if the estimated true location of the pair of points falls within a range of 6-10 m from the average origin, the error value calculated from those points can be grouped with the distribution associated with the 6-10 m range (e.g., the error value can be placed into the distribution associated with the 6-10 m range). In such embodiments, a calibration health metric can be calculated for each range (e.g., as described below in connection with 522), and the metric indicative of the highest degree of miscalibration can be used as the system health.

In some embodiments, each error value can be modified based on a threshold associated with a region that includes the point(s) used to calculate the error value, and the modified values of all error values can be added to a single distribution, where the mean of the distribution can be indicative of a likelihood that the pair of depth sensors is significantly miscalibrated. For example, each unscaled error value $e_i$ can be used to calculate a value $$1 - \frac{e_i}{e_{T,i}}$$

where $e_{T,i}$ is an error threshold association with a region that includes the pair of points used to calculate i. In such an example, an error over the threshold can contribute a negative value to the distribution (e.g., as $$\frac{e_i}{e_{T,i}} > 1$$

if $e_i > e_{T,i}$), and an error below the threshold can contribute a positive value to the distribution (e.g., as $$\frac{e_i}{e_{T,i}} < 1$$

if $e_i < e_{T,i}$). The mean of such a distribution can be used as a calibration health metric (e.g., as described below in connection with 522).

In some embodiments, process 500 can calculate an error metric (e.g., an unscaled error metric, or a scaled error metric) for each pair of points, for each feature of interest in the overlapping areas of the FOV.

In some embodiments, process 500 can use a relationship between multiple points on a candidate feature to attempt to directly solve for translation and/or rotation error between the pair of depth sensors. In such embodiments, a calibration health metric can be based on the translation and/or rotation error. For example, a threshold can be defined based on a permissible amount of each type of error and/or a combined amount of error. In a more particular example, there can be threshold translation error that is acceptable, and a threshold rotation error that is acceptable.

At 520, process 500 can store error metrics calculated at 518 in a data structure associated with the pair of depth sensors for which the error was calculated. In some embodiments, process 500 can store any suitable number of error metric data points for each pair of depth sensors. For example, process 500 can store up to N error metrics (e.g., scaled error metrics, or raw error metrics) for each pair of depth sensors. In a more particular example, process 500 can store up to N error metrics in a first-in-first-out (FIFO) data structure (e.g., implemented in software, or in hardware as a FIFO buffer) associated with each pair of depth sensors.

As another example, process 500 can store more than N error metrics (e.g., scaled error metrics, or raw error metrics) for each pair of depth sensors in any suitable data structure (e.g., a queue), and analysis of the error can be limited to the most recent N error metrics. In some embodiments, N can have any suitable value. For example, N can be in a range of several hundred to several thousand. In a more particular example, N can be in a range of [300,5000].

At 522, process 500 can determine a calibration health metric for each pair of depth sensors and/or for the entire system of depth sensors (e.g., the vision system of vessel 10). In some embodiments, process 500 can use any suitable technique or combination of techniques to determine a calibration health metric for each pair of depth sensors and/or for the entire system of depth sensors. For example, process 500 can use a distribution of error metrics (e.g., an N most recent error metrics for a particular pair of depth sensors) to determine a calibration health metric for each pair of depth sensors.

For example, process 500 can calculate a mean of the distribution to determine an estimate of the current degree of miscalibration between the pair of depth sensors. In such an example, a pair of perfectly calibrated depth sensors can be expected to produce zero error. In practice, calibration of the depth sensors to the global coordinate system can be expected to include some amount of error, and thus some degree of miscalibration can be expected even in a well calibrated vision system. As the degree of miscalibration increases, the probability of an autonomous navigation maneuver causing a collision due to error in locations of points in the point cloud data caused by miscalibration, and/or an autonomous navigation maneuver failing to bring the vessel to a target location due to noise in the point cloud data also increases. In some embodiments, the calibration health metric for a pair of cameras can be the mean of the distribution of error metrics for that pair of cameras.

In some embodiments, process 500 can calculate a probability that the population mean is below a threshold value. Additionally of alternatively, process 500 can calculate a probability that the population mean is above the threshold value. For example, process 500 can perform a one-sided test of the mean of the distribution (sometimes referred to as a one-tailed test). In such an example, the calibration health metric for a pair of cameras can be the probability that the mean of the distribution of error metrics for that pair of cameras is below (or above) the threshold value, based on the result of the one-sided test.

In some embodiments, process 500 can determine a system calibration metric based on the calibration health of each pair of depth sensors. For example, in some embodiments, process 500 can use the calibration health metric indicative of the largest degree of miscalibration as the system calibration health metric. In a more particular example, using a probability that the mean is below the threshold value as the calibration health metric, process 500 can use the lowest probability value as the system calibration health metric. As another example, if the calibration health metric of a pair is based on the mean of the associated distribution of error metrics (e.g., scaled error values), process 500 can determine whether each mean is above the threshold error and/or a second (e.g., critical threshold error (e.g., assigning a binary pass or fail indication to each pair based on whether the mean exceeds the threshold). In such an example, process 500 can determine the system health based on a number of pairs that have a mean that is above the threshold, and/or a number of pairs that have a mean that is above a second (e.g., critical) threshold. As yet another example, process 500 can determine the system health based a difference between each distribution mean and the threshold (e.g., each distribution can be associated with a value $$1 - \frac{\bar{s}}{s_T}$$

where $\bar{s}$ is the mean of the distribution, and $s_T$ is the threshold). In such an example, process 500 can determine the system health based on a mean of the values for each distribution.

In some embodiments, process 500 can calculate multiple health metrics for each pair of depth sensors. For example, process 500 can calculate a probability that the mean is below a first threshold value (e.g., indicative of significant miscalibration), and a probability that the mean is below a second threshold value (e.g., indicative of critical miscalibration).

At 524, process 500 can determine whether the calibration health metric is indicative of a significant degree of miscalibration. In some embodiments, process 500 can compare the calibration health metric to one or more threshold values to determine whether the calibration health metric (e.g., of a pair of depth sensors and/or the system) is indicative of significant miscalibration. For example, using the distribution mean as the calibration health metric, process 500 can determine whether the mean is above a first threshold indicative of significant miscalibration. In a more particular example, a tolerable scaled error can be about 0.02, and error indicative of significant miscalibration can a scaled error that is larger than 0.02 to about 0.1. In such an example, the first threshold can be around 0.02 (e.g., 0.02±0.001). As another example, using a probability that the mean is below a threshold value as the calibration health metric, process 500 can determine whether the probability is below a first threshold probability indicative of significant miscalibration. In a more particular example, a first threshold probability indicative of significant miscalibration can be in a range of about 80-70% probability that the mean is below the threshold. As yet another example, a tolerable scaled error can be about 0.02, and error indicative of significant miscalibration can a scaled error that has a predetermined probability of being larger than a threshold error around 0.1 (e.g., 0.1±0.01). In a more particular example, process 500 can determine whether a probability that the scaled error is below 0.1 is indicative of significant miscalibration if it is in a range of about 80-70% probability that the mean is below the threshold (or about a 20-30% probability that the mean is above the threshold for a probability that the scaled error is above the threshold).

If process 500 determines that the calibration health metric is indicative of significant miscalibration ("YES" at 524), process 500 can move to 526. Otherwise, if process 500 determines that the calibration health metric is not indicative of significant miscalibration ("NO" at 524), process 500 can return to 502.

At 526, process 500 can determine whether the calibration health metric is indicative of a critical degree of miscalibration (e.g., a level of miscalibration at which the likelihood of an error in an autonomous navigation feature leading to an undesirable outcome, such as a collision or a failure to reach a target area, becomes higher than an acceptable level of risk). In some embodiments, process 500 can compare the calibration health metric to one or more threshold values to determine whether the calibration health metric (e.g., of a pair of depth sensors and/or the system) is indicative of critical miscalibration. For example, using the distribution mean as the calibration health metric, process 500 can determine whether the mean is above a second threshold indicative of critical miscalibration. In a more particular example, a tolerable scaled error can be about 0.02, and error indicative of significant miscalibration can be about 0.1. In such an example, the first second can be around 0.1 (e.g., 0.1±0.01). As another example, using a probability that the mean is below a threshold value as the calibration health metric, process 500 can determine whether the probability is below a second threshold probability indicative of critical miscalibration. In a more particular example, a second threshold probability indicative of significant miscalibration can be in a range of about 50-40% probability that the mean is below the threshold. In some embodiments, one or more scaled error thresholds can be used to determine whether a miscalibration is significant or critical, and a probability can be calculated that the miscalibration exceeds (or does not exceed) the threshold. For example, a tolerable scaled error can be about 0.02, and error indicative of significant miscalibration can a scaled error that has a predetermined probability of being larger than a threshold error around 0.1 (e.g., 0.1±0.01). In a more particular example, process 500 can determine whether a probability that the scaled error is below 0.02 is indicative of significant miscalibration if it is in a range of about 50-40% probability that the mean is below the threshold of 0.02 (or about a 50-60% probability that the mean is above the threshold for a probability that the scaled error is above the threshold), and process 500 can determine whether a probability that the scaled error is below 0.1 is indicative of critical miscalibration if it is in a range of about 50-40% probability that the mean is below the threshold of 0.1 (or about a 50-60% probability that the mean is above the threshold for a probability that the scaled error is above the threshold).

If process 500 determines that the calibration health metric is indicative of critical miscalibration ("YES" at 526), process 500 can move to 527, and can generate a calibration alert indicative of critical miscalibration. In some embodiments, process 500 can use any suitable technique or combination of techniques to generate a calibration alert, such an alert can be in any suitable format, and/or such an alert can be provided to any suitable controller and/or location in memory. For example, the calibration alert generated at 527 can be formatted as a message (e.g., from sensor processor 70 to central controller 24) that indicates that the calibration health is critical, and/or an indication that one or more autonomous navigation features are to be disabled. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if calibration health is nominal, and can be set to a second value if the degree of miscalibration is not nominal.

At 528, process 500 can disable one or more autonomous navigation features. For example, if process 500 determines that the degree of miscalibration has reached a critical level, process 500 can disable autonomous navigation features, such as automatic docking. In such an example, process 500 can leave some autonomous features, such as autonomous certain autonomous safety features, enabled.

At 530, process 500 can cause a prompt to be presented to a user (e.g., via a user interface presented by a display of vessel 10, via a user interface of an application being executed on a mobile device paired with vessel 10, via a push notification to a mobile device, via email, via text message, etc.) indicating that recalibration is needed. In some embodiments, the prompt can include, or otherwise be associated with, an indication that one or more autonomous navigation features have been disabled due to the degree of miscalibration and/or the need for recalibration.

Additionally or alternatively, in some embodiments, at 530, process 500 can cause an indication that recalibration is needed to be presented to a technician or other servicer of vessel 10 (e.g., via a user interface presented by a display of vessel 10, via a user interface of an application being executed on a mobile device paired with vessel 10, via a push notification to a mobile device, via email, via text message, etc.).

Otherwise, if process 500 determines that the calibration health metric is not indicative of critical miscalibration ("NO" at 526), process 500 can move to 531, and can generate a calibration alert indicative of significant miscalibration. In some embodiments, process 500 can use any suitable technique or combination of techniques to generate such a calibration alert, such an alert can be in any suitable format, and/or such an alert can be provided to any suitable controller and/or location in memory. For example, the calibration alert generated at 531 can be formatted as a message (e.g., from sensor processor 70 to central controller 24) that indicates that the calibration health indicates a probability of significant miscalibration. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if calibration health is nominal, and can be set to a second value if the degree of miscalibration is not nominal.

At 532, process 500 can cause a prompt to be presented to a user (e.g., via a user interface presented by a display of vessel 10, via a user interface of an application being executed on a mobile device paired with vessel 10, via a push notification to a mobile device, via email, via text message, etc.) indicating that recalibration is suggested. In some embodiments, the prompt can include, or otherwise be associated with, an indication that one or more autonomous navigation features may be disabled if the degree of miscalibration and/or the need for recalibration becomes critical.

In some embodiments, the prompt at 530 and/or 532 can be associated with a selectable user interface element that facilitates a user requesting a feature-based recalibration. In some embodiments, a feature-based recalibration can use objects in the environment (e.g., at least some of which may not be calibration targets) to perform a recalibration of one or more of the depth sensors (e.g., to correct a significant or critical miscalibration).

At 534, process 500 can determine whether a request to perform a feature-based recalibration has been received. In some embodiments, a feature-based recalibration can be received via a user interface presented by a display of vessel 10, via an application being executed by a mobile device (e.g., paired with vessel 10, logged into an account associated with vessel 10, etc.). In some embodiments, 534 can be omitted, for example, if vessel 10 is not capable of performing a feature-based calibration.

If process 500 determines that a request to perform a feature-based recalibration has not been received ("NO" at 534), process 500 can return to 502. Otherwise, if process

500 determines that a request to perform a feature-based recalibration has been received ("YES" at 534), process 500 can move to 536.

At 536, process 500 can determine whether a feature-based recalibration is available using any suitable technique or combination of techniques. For example, process 500 can determine whether there are a suitable number of candidate features in the environment to perform a feature-based calibration with a sufficient number of points of interest. In a more particular example, a suitable number of points of interest can be on the order of high double digits to hundreds of points of interest. As another example, process 500 can determine whether there are sufficient interest points spread over an appropriate range (e.g., a vertical range encompassing at least half of the vertical portion of the sensor FOV, at least one third of the vertical portion of the sensor FOV, etc.). As yet another example, process 500 can determine whether there is sufficient space to perform a feature-based calibration based on the location of the points of interest. In a more particular example, process 500 can determine whether a radius of about twice the vessels overall length is clear (e.g., as the vessel may need to rotate 360 degrees during the calibration process). As still another example, process 500 can determine whether environmental conditions are sufficiently calm to perform a feature-based calibration. In a more particular example, process 500 can determine whether the windspeed and/or current exceeds a threshold velocity (e.g., about 0.66 meters/second) as the control system may not be able to maintain a relatively stable position when the windspeed and/or current exceeds the threshold velocity.

At 538, process 500 can perform a feature-based recalibration using any suitable technique or combination of techniques.

At 540, process 500 can determine whether the feature-based recalibration was successful at 538. For example, process 500 can determine whether the calibration health metric has sufficiently improved (e.g., is no longer indicative of significant miscalibration). As another example, process 500 can determine whether the distributions for pairs that previously had at least significant miscalibration become bimodal, forming a second mode below the error threshold (e.g., as newer, smaller error measurements replace older, larger error measurements). In some embodiments, if the system calibration health continues to improve, process 500 can continue monitoring the calibration health (e.g., at a relatively high rate) until the system health indicates that calibration health is nominal (and/or until the distributions for each pair of sensors falls below the error threshold value).

If process 500 determines that the recalibration was not successful ("NO" at 540), process 500 can move to 542. In some embodiments, process 500 can determine that calibration was not successful if the calibration health has not sufficiently improved after a predetermined number of interest points have been evaluated (e.g., after the predetermined number of error metrics have been calculated and stored in the data structure). For example, the predetermined number of interest points can be about N/2 samples collected after attempting to perform the recalibration at 538.

At 542, process 500 can cause a prompt to be presented to a user (e.g., via a user interface presented by a display of vessel 10, via a user interface of an application being executed on a mobile device paired with vessel 10, via a push notification to a mobile device, via email, via text message, etc.) requesting that a target-based recalibration be performed (e.g., by a service technician). In some embodiments, process 500 can attempt to perform recalibration again (e.g., up to a predetermined number of attempts, such as 2 or 3 attempts). If the calibration has not improved after the predetermined number of attempts, process 500 can cause the prompt to be presented to the user at 542.

At 544, process 500 can include a target-based recalibration that is performed with the assistance and/or at the direction of a service technician.

In some embodiments, 536-540 can be omitted, for example, if vessel 10 is not capable of performing a feature-based calibration. Additionally, in some embodiments, if the calibration health metric is indicative of significant miscalibration at 524, but not critical miscalibration at 526, process 500 can omit 542-546 (e.g., process 500 can return to 502 if feature-based miscalibration is not available.

In some embodiments, if a user has been prompted to perform a recalibration at 530 or 532, process 500 can omit causing another prompt to perform a recalibration from being presented for a predetermined period of time (e.g., 1 day, multiple days, 1 week, etc.).

Otherwise, if process 500 determines that the recalibration was successful ("YES" at 540) or after a target-based recalibration is performed, process 500 can move to 546. At 546, process 500 can permit one or more autonomous features that were disabled at 528 to be used (e.g., to be re-enabled).

In some embodiments, one or more portions of process 500 can be performed periodically (e.g., at regular and/or irregular intervals) at a periodicity that is less frequent than a periodicity of a vision system generating depth information. For example, a vision system of a vessel (e.g., vessel 10) can generate depth information using depth sensors at a relatively high rate (e.g., multiple times per second), and can generate calibration health information at a lower rate (e.g., less than one time per second).

In some embodiments, a periodicity at which process 500 is performed can be adjusted based on characteristics of the error metric data stored in the data store. For example, if there is uncertainty in the calibration health metric (e.g., due to a small number of elements in the set of error data, or high variance in the error data), process 500 can be executed more frequently. As the amount of certainty in the calibration health metric increases, process 500 can be executed less frequently.

Figure 6A:
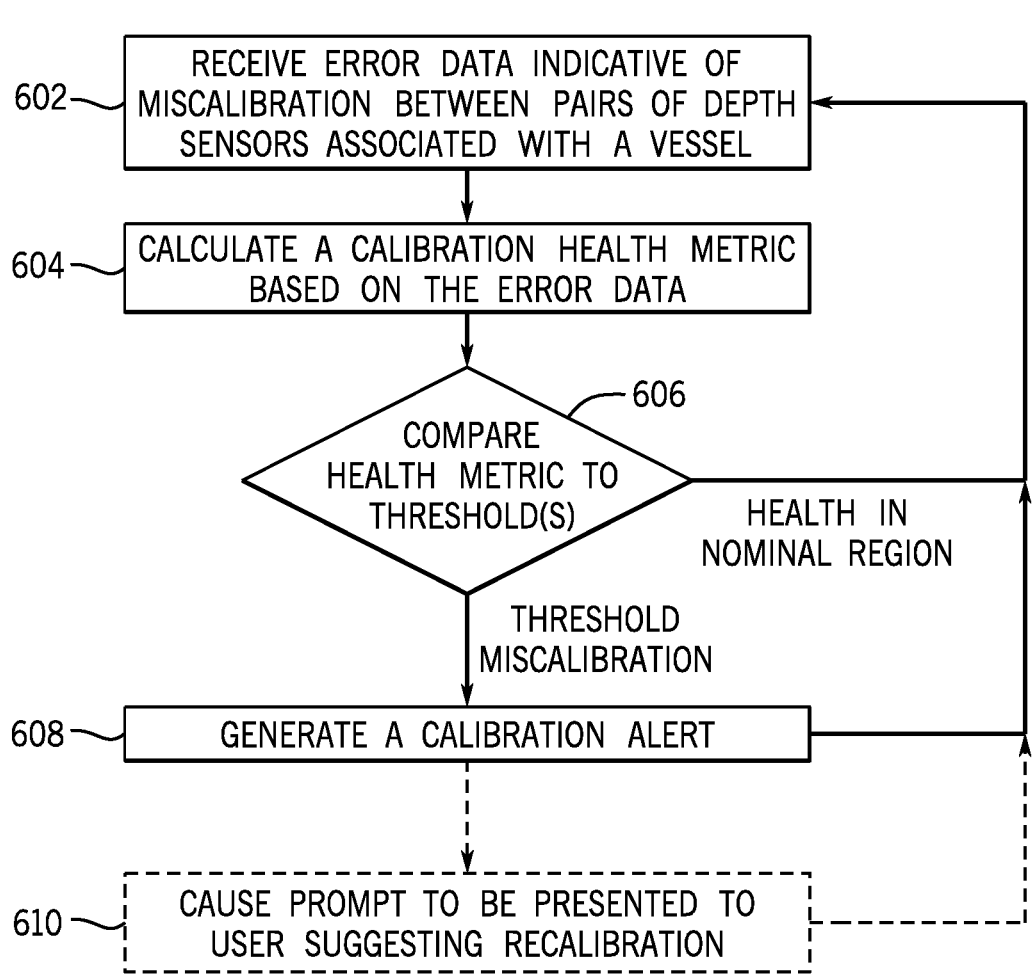
FIG. 6A shows an example of a process for monitoring calibration health of a vision system on a marine vessel in accordance with some embodiments of the disclosure.

FIG. 6A shows an example of a process 600 for monitoring calibration health of a vision system on a marine vessel in accordance with some embodiments of the disclosed subject matter.

At 602, process 600 can receive error data indicative of miscalibration between pairs of depth sensors associated with a vessel (e.g., vessel 10). In some embodiments, the error data can be error data generated using 502-520 of process 500. Alternatively, in some embodiments, the error data can be error data generated using any other suitable technique or combination of techniques.

At 604, process 600 can determine a calibration health metric for each pair of depth sensors and/or for the entire system of depth sensors (e.g., the vision system of vessel 10) using any suitable technique or combination of techniques, such as techniques described above in connection with 522 of FIG. 5.

At 606, process 600 can compare the health metric for each pair of depth sensors and/or the vision system to one or more thresholds (e.g., a first threshold indicative of significant miscalibration, and a second threshold indicative of critical miscalibration).

If process 600 determines that the health metric for a particular is in a nominal region indicative of an acceptable degree of miscalibration ("Health in nominal region" at 606), process 600 can return to 602. In some embodiments, the nominal region can be above a threshold (or above a first threshold and a second threshold). For example, where the health metric is a probability of the mean of a distribution being below a threshold, the calibration health can be nominal when the probability is above a particular threshold probability (e.g., as a higher probability indicates that the pair of cameras are more likely to be well calibrated). Alternatively, in some embodiments, the nominal region can be below a threshold. For example, where the health metric is a probability of the mean of a distribution being above a threshold, the calibration health can be nominal when the probability is below (or less than or equal to) a particular threshold probability (e.g., as a higher probability indicates that the pair of cameras are more likely to be significantly or critically miscalibrated). As another example, where the health metric is the mean of a distribution, the calibration health can be nominal when the mean is below a particular threshold error (e.g., as a higher mean error indicates that the pair of cameras are more likely to be significantly or critically miscalibrated).

If process 600 determines that the health metric is in a region indicative of a significant degree of miscalibration and/or a critical degree of miscalibration ("Threshold miscalibration" at 606), process 600 can move to 608. In some embodiments, the calibration health can satisfy a threshold indicative of at least significant miscalibration if the calibration health value is less than (or less than or equal to) a threshold. For example, where the health metric is a probability of the mean of a distribution being below a threshold, the calibration health can indicate a threshold level of miscalibration (e.g., corresponding to significant miscalibration, corresponding to critical miscalibration) when the probability is below a threshold. Alternatively, in some embodiments, the calibration health can satisfy a threshold indicative of at least significant miscalibration if the calibration health value is greater than (or greater than or equal to) a threshold. For example, where the health metric is a probability of the mean of a distribution being above a threshold, the calibration health can indicate a threshold level of miscalibration (e.g., corresponding to significant miscalibration, corresponding to critical miscalibration) when the probability is above a threshold probability. As another example, where the health metric is the mean of a distribution, the calibration health can indicate a threshold level of miscalibration (e.g., corresponding to significant miscalibration, corresponding to critical miscalibration) when the mean is above a threshold error.

At 608, process 600 can generate a calibration alert indicative of a threshold degree of miscalibration. In some embodiments, process 500 can use any suitable technique or combination of techniques to generate such a calibration alert, such an alert can be in any suitable format, and/or such an alert can be provided to any suitable controller and/or location in memory. For example, the calibration alert generated at 531 can be formatted as a message (e.g., from sensor processor 70 to central controller 24) that indicates that the calibration health indicates a probability of significant miscalibration. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if calibration health is nominal, and can be set to a second value if the degree of miscalibration is not nominal.

Additionally or alternatively, in some embodiments, at 608, process 600 can cause an indication that recalibration is needed to be presented to a technician or other servicer of vessel 10 (e.g., via a user interface presented by a display of vessel 10, via a user interface of an application being executed on a mobile device paired with vessel 10, via a push notification to a mobile device, via email, via text message, etc.).

At 610, process 600 can cause a prompt to be presented to a user (e.g., via a user interface presented by a display of vessel 10, via a user interface of an application being executed on a mobile device paired with vessel 10, via a push notification to a mobile device, via email, via text message, etc.) indicating that recalibration is suggested and/or required to continue using autonomous navigation features. In some embodiments, the prompt can include, or otherwise be associated with, an indication that one or more autonomous navigation features may be, or has been, disabled if the degree of miscalibration and/or the need for recalibration becomes critical, or has already become critical.

In some embodiments, the prompt at 610 can be associated with a selectable user interface element that facilitates a user requesting a feature-based recalibration (e.g., as described above in connection with 530 of FIG. 5). In some embodiments, a feature-based recalibration can use objects in the environment (e.g., at least some of which may not be calibration targets) to perform a recalibration of one or more of the depth sensors (e.g., to correct a significant or critical miscalibration). Additionally or alternatively, in some embodiments, the prompt at 610 can be associated with a selectable user interface element that facilitates a user scheduling and/or requesting a target-based recalibration (e.g., as described above in connection with 542 of FIG. 5).

In some embodiments, 610 can be omitted. For example, recalibration (e.g., via a feature-based recalibration process) can be initiated automatically in response to generating a calibration report. In such an example, prompting a user at 610 to suggest recalibration can be omitted.

Figure 6B:
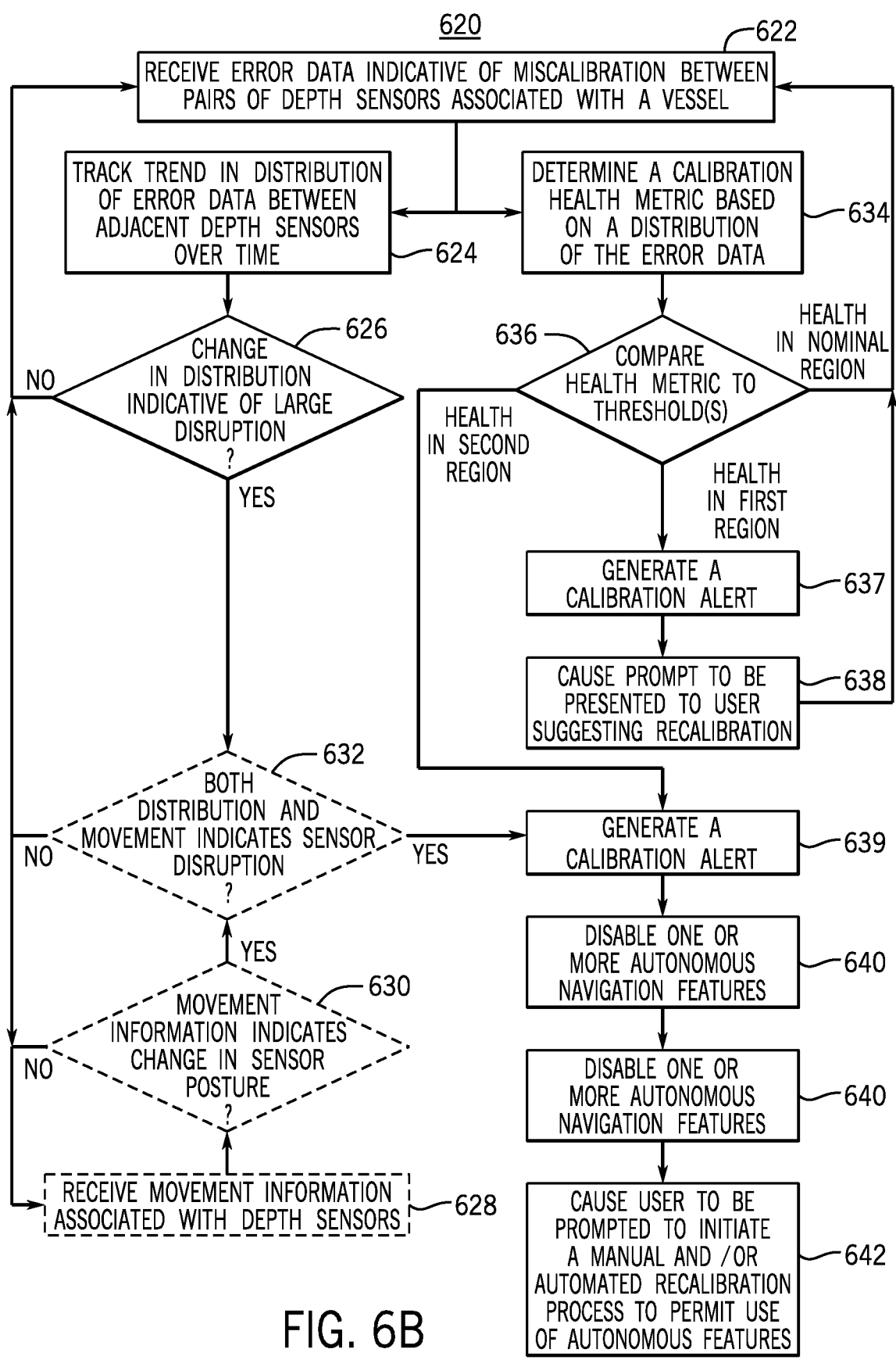
FIG. 6B shows another example of a process for monitoring calibration health of a vision system on a marine vessel in accordance with some embodiments of the disclosure.

FIG. 6B shows an example of a process 620 for monitoring calibration health of a vision system on a marine vessel in accordance with some embodiments of the disclosed subject matter.

At 622, process 620 can receive error data indicative of miscalibration between pairs of depth sensors associated with a vessel (e.g., vessel 10). In some embodiments, the error data can be error data generated using 502-520 of process 500. Alternatively, the error data can be error data generated using any other suitable technique or combination of techniques.

Figures 12A, 12B:
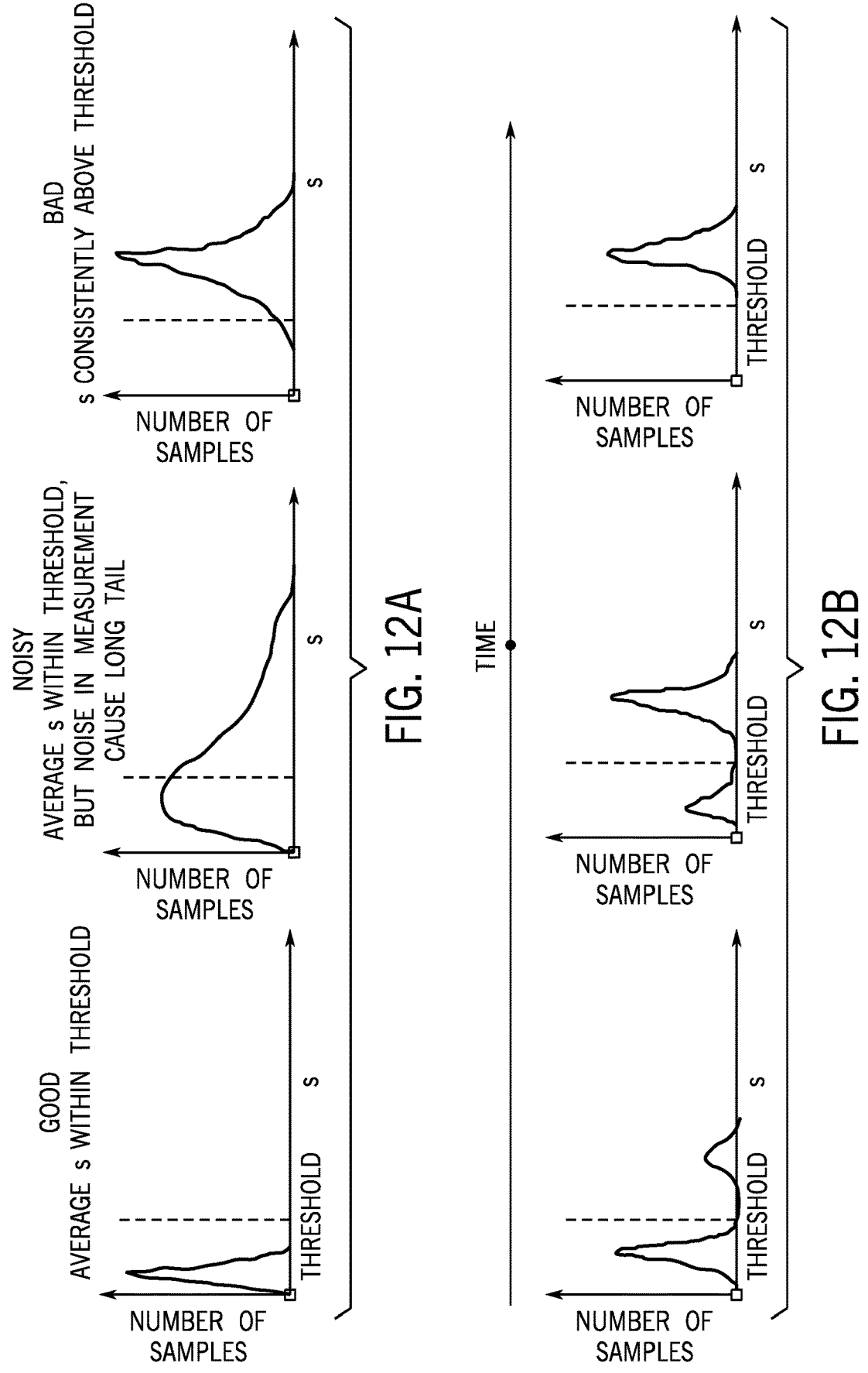
FIG. 12A shows various distributions of error metrics corresponding to different calibration health levels of a vision system on the marine vessel in accordance with some embodiments of the disclosed subject matter.
FIG. 12B shows changes in a distribution of error metrics over time that can be indicative of a large disruption to a camera of a vision system on the marine vessel in accordance with some embodiments of the disclosed subject matter.

At 624, process 620 can track a trend of a distribution of the error data between adjacent depth sensors over time. For example, process 620 can determine whether each distribution of error metrics (e.g., an N most recent scaled or raw error metrics for each pair of depth sensors) has become bimodal (e.g., having two maxima that are a predetermined distance from each other). In such an example, process 620 can determine whether there are two maxima in the distribution, with one maxima over a threshold error metric value and the other metric under the threshold error metric value (e.g., as shown in FIG. 12B). As another example, process 620 can determine whether each distribution of error metrics has become bimodal, and a mode above the threshold is growing (e.g., the number of data points in the mode above the threshold is increasing, while the number of data points in the mode below the threshold is decreasing).

In some embodiments, when two adjacent pairs of depth sensors have a distribution that has become bimodal, it can indicate that one of the depth sensors (e.g., the depth sensor that is part of both pairs) has had a significant change in posture (e.g., a position of the depth sensor with respect to vessel 10 and/or the other depth sensors, and/or a direction in which the depth sensor is angled). Additionally or alternatively, when two adjacent pairs of depth sensors have a distribution that has become bimodal, it can indicate that one of the depth sensors (e.g., the depth sensor that is part of both pairs) has had a significant change in its intrinsic parameters.

At 626, process 620 can determine whether there has been a change in the error distributions that is indicative of a large disruption. For example, process 620 can determine whether two adjacent pairs of depth sensors both have a distribution that has become bimodal.

If process 620 determines that there has not been a change in the error distributions that is indicative of a large disruption ("NO" at 626), process 620 can return to 622.

Otherwise, if process 620 determines that there has been a change in the error distributions that is indicative of a large disruption ("YES" at 626), process 620 can move to 632 (or 640 if 628-632 are omitted).

At 628, process 620 can receive movement information associated with depth sensors of a vision system of a vessel (e.g., vessel 10) for which process 620 is being executed. In some embodiments, the movement information can be any suitable movement information, such as acceleration information (e.g., linear acceleration and/or angular acceleration), a change in attitude, and/or a change in heading. For example, such movement information can be output by an IMU associated with a depth sensor (e.g., co-located with the depth sensor and/or integrated into the depth sensor). As another example, movement information can be estimated using images (or other data) captured by depth sensors (e.g., using image analysis techniques).

Additionally, in some embodiments, process 620 can receive, at 628, movement information associated with the vessel to which the depth sensors are mounted (e.g., from an IMU configured to measure movement of the vessel, such as main IMU 36).

At 630, process 620 can determine whether the movement information received at 628 indicates that one or more sensors has changed its posture with respect to the vessel and/or one or more other depth sensors. In some embodiments, process 620 can use any suitable technique or combination of techniques to determine whether the movement information is indicative of one or more sensors having changed posture with respect to the vessel and/or one or more other depth sensors. In some embodiments, process 620 can use information about the positions of the depth sensors to determine whether the movement information of one or more of the sensors is inconsistent with the other movement information, which may indicate that one of the depth sensors changed posture. For example, process 620 can determine whether a magnitude in a movement of a particular sensor is significantly higher than movements associated with other sensors (e.g., the movement spiked for a particular sensor, but not for other sensors in the system. In a more particular example, process 620 can determine whether a magnitude in a movement of a particular sensor is significantly higher than movements associated with other sensors if an impulse of less than a few seconds in length causes a rotation of at least 5 degrees with respect to the vessel. If there is a spike for a single camera, process 620 can determine that the sensor associated with the spike was likely displaced. For example, process 620 can use a model to calculate an expected movement of each depth sensor (e.g., based on information from a main IMU), and can compare the expected movement of each depth sensor to the measured movement. In a more particular example, if the movement information from the main IMU indicates that the vessel is experiencing a relatively low net acceleration toward the port or starboard sides of the vessel (e.g., because the vessel is moving forward), and movement data from a depth sensor indicates that a relatively large acceleration toward the port side of the vessel has occurred, process 620 can determine that the movement information is indicative of one or more sensors having changed posture with respect to the vessel and/or one or more other depth sensors.

In some embodiments, process 620 can use information about the direction of an acceleration due to gravity with respect to the depth sensor to determine whether one or more of the sensors has changed posture. For example, during relatively static situations (e.g., when acceleration and/or rotation outputs from IMUs 62-68 (and if present main IMU 36) indicate that there is no more than a threshold linear or rotational acceleration, the relative orientation between the gravity vectors associated with IMUs 62-68 (and if present main IMU 36) can be used to determine whether the posture of one of depth sensors 72-78 has changed. For example, when transformed into the global coordinate system, all gravity vectors can be expected to be roughly parallel, and a gravity vector that is aligned in a different direction can indicate that the posture of the depth sensor associated with that gravity vector has changed since a calibration was performed. In a more particular example, the gravity vector associated with each depth sensor can be compared to a gravity vector associated with main IMU 36, and a substantial difference between the directions of the two vectors can indicate that the depth sensor has changed posture. As another more particular example, the gravity vector associated with each depth sensor can be compared to a gravity vector associated with one or more other depth sensors (e.g., if main IMU 36 is omitted, or as another indication of a change of posture independent of information from IMU 36), and a substantial difference between the directions of the two vectors can indicate that one of the depth sensors has changed posture.

If process 620 determines that there has not been a change in posture of one of the depth sensors ("NO" at 630), process 620 can return to 628.

Otherwise, if process 620 determines that there has been a change in posture of one of the depth sensors ("YES" at 630), process 620 can move to 632.

At 632, process 620 can determine whether both the distribution information and the movement information indicate a depth sensor disruption of the same depth sensor. For example, if a depth sensor is in two adjacent pairs of depth sensors that both have a bimodal distribution, and the movement information indicates that the depth sensor has experienced movement that is inconsistent with movement of the vessel (e.g., "YES" at both 626 and 630), process 620 can determine that the sensor has experienced a large disruption (e.g., due to an impact on or around the sensor, due to a fastener becoming loose, etc.).

If process 620 determines that one of the distribution information or the movement information indicate that a depth sensor disruption has not occurred ("NO" at 632), process 620 can return to 622 and/or 628, to continue monitoring the distribution and/or movement data.

Otherwise, if process 620 determines that both the distribution information and the movement information indicate that a particular depth sensor disruption has occurred ("YES" at 632), process 620 can move to 640.

In some embodiments, 628-632 can be omitted. For example, if the depth sensors are not associated with movement sensors (e.g., IMUs, accelerometers, etc.) and/or is not configured to determine depth sensor movement using other techniques, 628-632 can be omitted.

At 634, process 620 can determine a calibration health metric for each pair of depth sensors and/or for the entire system of depth sensors (e.g., the vision system of vessel 10) using any suitable technique or combination of techniques, such as techniques described above in connection with 522 of FIG. 5.

At 636, process 620 can compare the health metric for each pair of depth sensors and/or the vision system to one or more thresholds (e.g., a first threshold indicative of significant miscalibration, and a second threshold indicative of critical miscalibration).

If process 620 determines that the health metric for a particular is in a nominal region indicative of an acceptable degree of miscalibration ("Health in nominal region" at 636), process 620 can return to 622. In some embodiments, the nominal region can be above a first threshold and a second threshold. For example, where the health metric is a probability of the mean of a distribution being below a threshold, the calibration health can be nominal when the probability is above a particular threshold probability (e.g., as a higher probability indicates that the pair of cameras are more likely to be well calibrated). Alternatively, in some embodiments, the nominal region can be below a first threshold and a second threshold (or less than or equal to the first threshold and below the second threshold). For example, where the health metric is a probability of the mean of a distribution being above a threshold, the calibration health can be nominal when the probability is below (or less than or equal to) a particular threshold probability (e.g., as a higher probability indicates that the pair of cameras are more likely to be significantly or critically miscalibrated). As another example, where the health metric is the mean of a distribution, the calibration health can be nominal when the mean is below a particular threshold error (e.g., as a higher mean error indicates that the pair of cameras are more likely to be significantly or critically miscalibrated).

If process 620 determines that the health metric is in a first region indicative of a significant degree of miscalibration ("Health in first region" at 636), process 620 can move to 637. In some embodiments, the first region can be below a first threshold and above a second threshold (or greater than or equal to the second threshold). For example, where the health metric is a probability of the mean of a distribution being below a threshold, the calibration health can be in a first region (e.g., corresponding to significant miscalibration) when the probability is below a first threshold probability and greater than or equal to a second threshold probability. Alternatively, in some embodiments, the first region can be above a first threshold and below a second threshold (or less than or equal to the second threshold). For example, where the health metric is a probability of the mean of a distribution being above a threshold, the calibration health can be in the first region when the probability is above a first threshold probability and less than or equal to a second threshold probability. As another example, where the health metric is the mean of a distribution, the calibration health can be in the first region when the mean is above a first threshold and less than or equal to a second threshold error.

At 637, process 620 can generate a calibration alert indicative of significant miscalibration. In some embodiments, process 620 can use any suitable technique or combination of techniques to generate such a calibration alert, such an alert can be in any suitable format, and/or such an alert can be provided to any suitable controller and/or location in memory. For example, the calibration alert generated at 637 can be formatted as a message (e.g., from sensor processor 70 to central controller 24) that indicates that the calibration health indicates a probability of significant miscalibration. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if calibration health is nominal, and can be set to a second value if the degree of miscalibration is not nominal.

At 638, process 620 can cause a prompt to be presented to a user (e.g., via a user interface presented by a display of vessel 10, via a user interface of an application being executed on a mobile device paired with vessel 10, via a push notification to a mobile device, via email, via text message, etc.) indicating that recalibration is suggested. In some embodiments, the prompt can include, or otherwise be associated with, an indication that one or more autonomous navigation features may be disabled if the degree of miscalibration and/or the need for recalibration becomes critical.

In some embodiments, the prompt at 638 can be associated with a selectable user interface element that facilitates a user requesting a feature-based recalibration. In some embodiments, a feature-based recalibration can use objects in the environment (e.g., at least some of which may not be calibration targets) to perform a recalibration of one or more of the depth sensors (e.g., to correct a significant or critical miscalibration).

If process 620 determines that the health metric is in a second region indicative of a critical degree of miscalibration ("Health in second region" at 636), process 620 can move to 639. In some embodiments, the first region can be below a first threshold and above a second threshold. For example, where the health metric is a probability of the mean of a distribution being below a threshold, the calibration health can be in a first region (e.g., corresponding to significant miscalibration) when the probability is below a first threshold probability and greater than or equal to a second threshold probability. Alternatively, in some embodiments, the first region can be above a first threshold and below a second threshold. For example, where the health metric is a probability of the mean of a distribution being above a threshold, the calibration health can be in the first region when the probability is above a first threshold probability and less than or equal to a second threshold probability. As another example, where the health metric is the mean of a distribution, the calibration health can be in the first region when the mean is above a first threshold and less than or equal to a second threshold error.

At 639, process 620 can generate a calibration alert indicative of critical miscalibration. In some embodiments, process 620 can use any suitable technique or combination of techniques to generate a calibration alert, such an alert can be in any suitable format, and/or such an alert can be provided to any suitable controller and/or location in memory. For example, the calibration alert generated at 639 can be formatted as a message (e.g., from sensor processor 70 to central controller 24) that indicates that the calibration health is critical, and/or an indication that one or more autonomous navigation features are to be disabled. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if calibration health is nominal, and can be set to a second value if the degree of miscalibration is not nominal.

At 640, process 620 can disable one or more autonomous navigation features (e.g., as described above in connection with 528 of FIG. 5). Note that process 620 can continue to monitor the calibration health metric and/or distributions of error data after autonomous features are disabled (e.g., by returning to 622). If the calibration health improves and/or the trend in the distributions reverse (e.g., to a normal distribution below the threshold), process 620 can enable the autonomous features without a recalibration process being performed.

At 642, process 620 can cause a prompt to be presented to a user (e.g., via a user interface presented by a display of vessel 10, via a user interface of an application being executed on a mobile device paired with vessel 10, via a push notification to a mobile device, via email, via text message, etc.) indicating that recalibration is needed and/or to prompt the user to initiate a manual recalibration (e.g., a target-based recalibration performed with the assistance of a service technician) or an automated recalibration (e.g., a feature-based recalibration as described above in connection with 536 and 538 of FIG. 5, or a target-based recalibration that is performed by a device, such as a processor of vessel 10, without the assistance of a service technician). In some embodiments, the prompt can include, or otherwise be associated with, an indication that one or more autonomous navigation features have been disabled due to the degree of miscalibration and/or the need for recalibration.

Additionally or alternatively, in some embodiments, at 642, process 620 can cause an indication that recalibration is needed to be presented to a technician or other servicer of vessel 10 (e.g., via a user interface presented by a display of vessel 10, via a user interface of an application being executed on a mobile device paired with vessel 10, via a push notification to a mobile device, via email, via text message, etc.).

In some embodiments, process 620 can execute different portions in parallel (e.g., 622-626, 622-636, and 628-630 can all be executed in parallel). In some embodiments, one or more portions of process 620 can be performed periodically (e.g., at regular and/or irregular intervals) at a periodicity that is less frequent than a periodicity of a vision system generating depth information and/or less frequent than a motion sensing system generating movement information. For example, a vision system of a vessel (e.g., vessel 10) can generate depth information using depth sensors at a relatively high rate (e.g., multiple times per second), and can generate calibration health information at a lower rate (e.g., less than one time per second) and/or monitor a trend in a distribution of error data at a lower rate (e.g., less than one time per second).

Figure 7:
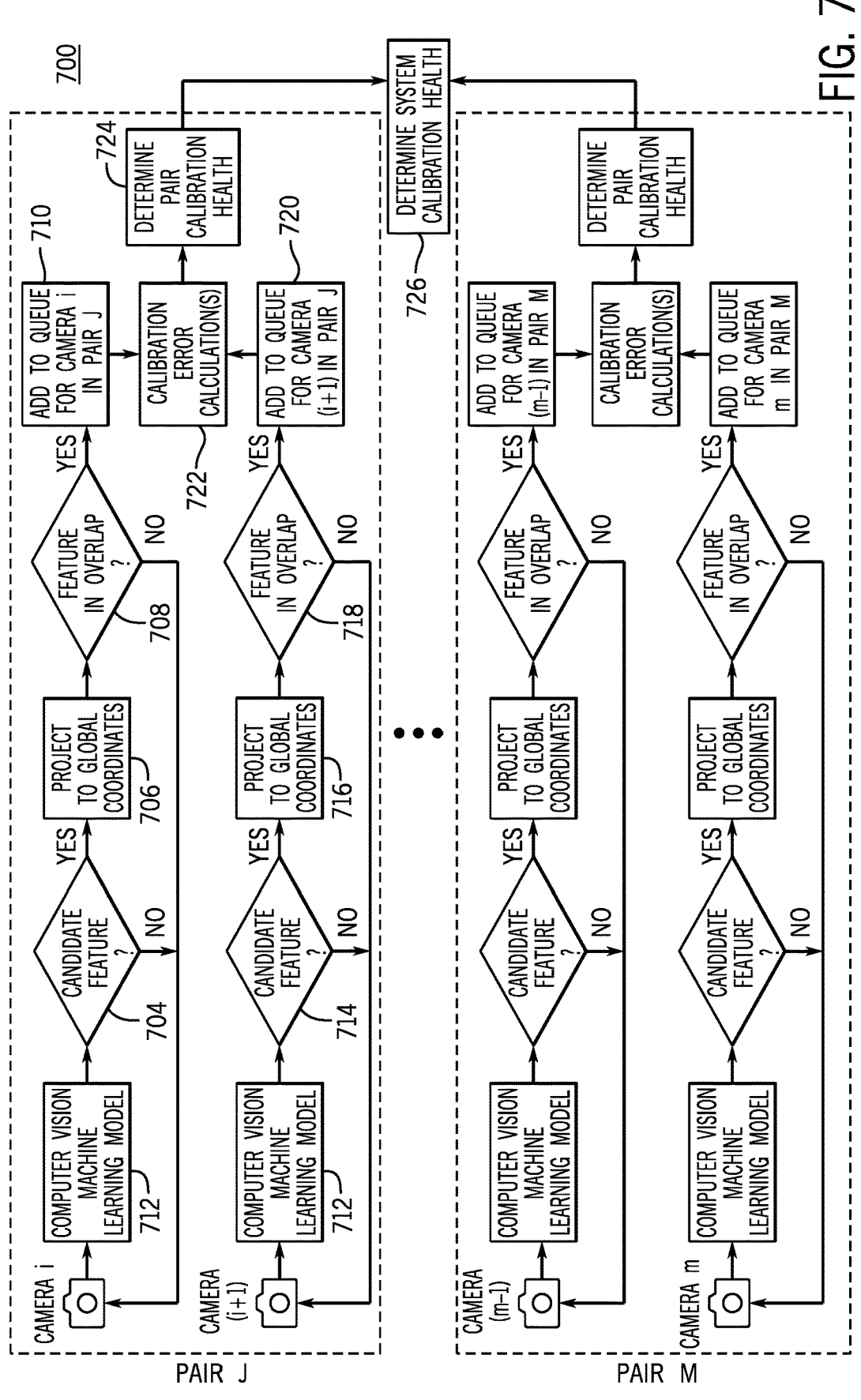
FIG. 7 shows an example of a process for estimating a system calibration health metric of a vision system on a marine vessel in accordance with some embodiments of the disclosure.

FIG. 7 shows an example of a process 700 for estimating a system calibration health metric of a vision system on a marine vessel in accordance with some embodiments of the disclosed subject matter.

At 702, process 700 can include providing one or more images from a camera i (e.g., a particular depth sensor, such as one of depth sensors 72-78) to a computer vision machine learning model (e.g., a trained machine learning model) to generate information that can be used to identify candidate features in a field of view of camera i. For example, as described above in connection with 504 of FIG. 5, the computer vision machine learning model can generate segmentation information that includes classification information that indicates which of a set of classes different portions of the image are most likely to correspond.

At 704, process 700 can determine whether there are any candidate features in the image(s) provided by camera i using any suitable technique or combination of techniques. For example, process 700 can use techniques described above in connection with 506 of FIG. 5.

If process 700 determines that there is not at least one candidate feature in the image ("NO" at 704), process 700 can return to capturing and/or analyzing additional images. Otherwise, if process 700 determines that there is at least one candidate feature in the image ("YES" at 704), process 700 can move to 706. Note that if there are no candidate features in the image, process 700 can return to capturing additional pictures, which can mitigate computation overhead from evaluating features in every image and/or at set times regardless of whether the features in the image are likely to have sufficient points of interest (e.g., analysis of features with low signal to noise ratio can be avoided).

At 706, process 700 can project the points from the candidate features to a global coordinate system (e.g., a coordinate system into which all depth sensors project data). Note that in some embodiments, points of the candidate features may be projected to the global coordinate system as part of another process (e.g., a computer vision process used by vessel 10 for autonomous navigation and/or advanced operator assistance techniques).

At 708, process 708 can determine whether any of the candidate features are in an overlap between a FOV of camera i, and a FOV of camera i+1, in pair J of the depth sensors. Note that process 700 can include a determination of whether any of the candidate features are in an overlap between a FOV of camera i, and a FOV of camera i–1, in as part of another pair of depth sensors (e.g., pair J–1, pair M, pair M+1, etc.). In such an example, 702-706 can be performed once, and a determination of whether any of the candidate features are in an overlap between a FOV of camera i and a FOV of a camera in pair J and in another pair can both be performed based on the data generated at 702-706. In some embodiments, process 700 can use any suitable technique or combination of techniques to determine whether any of the candidate features are in an overlap between a FOV of camera i, and a FOV of another camera (e.g., camera i+1), Such as techniques described above in connection with 512 of FIG. 5A.

If process 700 determines that there are no candidate features in the overlapping portions of the FOV ("NO" at 708), process 700 can return to capturing and/or analyzing additional images. Otherwise, if process 700 determines that there are one or more candidate features in the overlapping portions of the FOV ("YES" at 708), process 700 can move to 710.

At 710, process 700 can add any candidate features that are at least partially in the overlapping regions of the FOVs of camera i, and camera i+1 into a queue (or other suitable data structure) of candidate features for camera i, in pair J. Additionally or alternatively, in some embodiments, the interest points associated with the candidate features that are at least partially in the overlapping regions of the FOVs of camera i, and camera i+1 can be added to the queue (e.g., labeled with a class of the feature to which the point corresponds).

At 712-720, process 700 can perform similar actions to those described above in connection with 702-710, but for camera i+1, rather than camera i.

At 722, process 700 can calculate calibration error based on candidate features that appear in the queues for both camera i and camera i+1 for pair J. In some embodiments, process 700 can use any suitable technique or combination of techniques to calculate calibration errors, such as techniques described above in connection with 514-520 of FIG. 5A.

At 724, process 700 can determine a calibration health metric for pair J using any suitable technique or combination of techniques, such as techniques described above in connection with 522 of FIG. 5A.

As shown in FIG. 7, in some embodiments, 702-722 can be performed for multiple pairs of depth sensors, such that a calibration health metric is determined for each pair of depth sensors that have overlapping FOVs (e.g., up to M pairs of depth sensors). Note that some depth sensors can appear in multiple pairs, while other depth sensors may appear in only one pair (e.g., depending on the number of depth sensors, and the configuration in which the sensors are mounted).

At 726, process 700 can determine a calibration health metric for the vision system that includes the M pairs of depth sensors, using any suitable technique or combination of techniques, such as techniques described above in connection with 522 of FIG. 5A.

Figure 8:
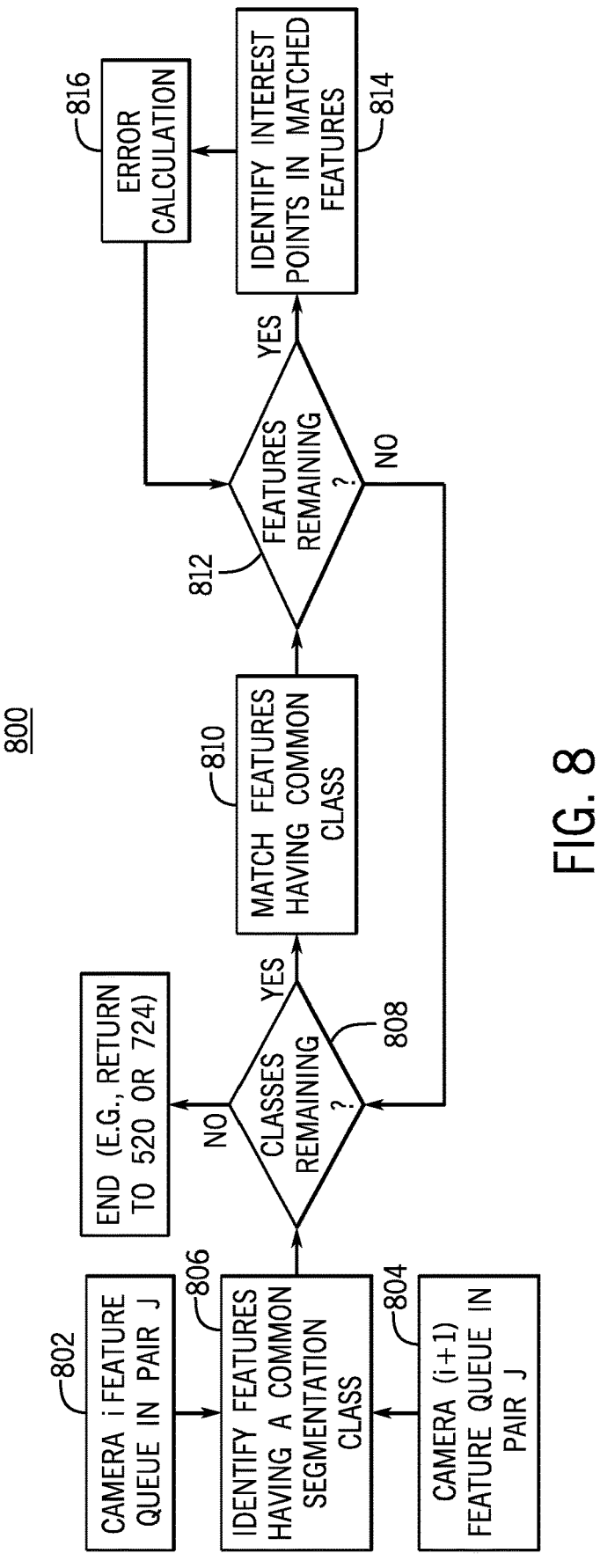
FIG. 8 shows an example of a process for identifying points of interest imaged by both cameras of a pair of cameras of a vision system on a marine vessel and calculating an error metric for the pair of cameras using the points of interest in accordance with some embodiments of the disclosure.

FIG. 8 shows an example of a process 800 for identifying points of interest imaged by both cameras of a pair of cameras of a vision system on a marine vessel and calculating an error metric for the pair of cameras using the points of interest in accordance with some embodiments of the disclosed subject matter.

At 802, process 800 can receive and/or retrieve (e.g., from memory 232, from depth sensor device 202, etc.) a queue of candidate features for camera i in pair J.

At 804, process 800 can receive and/or retrieve (e.g., from memory 232, from depth sensor device 202, etc.) a queue of candidate features for camera i+1 in pair J. In some embodiments, the queue of candidate features received and/or retrieved at 802 and/or 804 can include any suitable information, such as labels associated with the features, and may or may not include the points (e.g., point cloud point coordinates) or points associated with the features, a pointer to a memory location(s) at which the points are stored, etc.

At 806, process 800 can identify features that appear in both queues and that have a common segmentation class (e.g., that are labeled as the same type of feature).

At 808, process 800 can determine whether there is at least one common class in both queues for which candidate features from the two queues have been matched. If process 800 determines that there are no common classes that have not been matched ("NO" at 808), process 800 can end (e.g., by returning to a portion of process 500 and/or 700, such as 520 or 722). Otherwise, if process 800 determines that there is at least one common class that has not been matched ("YES" at 808), process 800 can move to 810.

At 810, process 800 can match features from the two queues having a common class. For example, if objects with class "boat" appear in both queues, at 810 process 800 can match those objects as features to be used to calculate error metrics. In some embodiments, if multiple instances of the same class appear in one or both queues, process 800 can match the features with a one-to-one correspondence (e.g., based on location in the global coordinate system). For example, process 800 can determine a location of a center point of each feature labeled with the common class label, and match features having the closest center points. As another example, process 800 can combine multiple features of the same type into a single feature (e.g., where feature instances are labeled). As yet another example, if there are multiple instances of the same feature type, process 800 can select a feature having the most points in the overlapping volume to use, and can reject other features of the same type.

At 812, process 800 can determine whether there are any pairs of features of the common class for which an error calculation has not been performed. If process 800 determines that there is at least one pair of features for which an error calculation has not been performed ("YES" at 812), process 800 can move to 814. Otherwise, if process 800 determines that there is not at least one pair of features for which an error calculation has not been performed ("NO" at 812), process 800 can return to 808.

At 814, process 800 can identify interest points in each of the matched features and/or determine a correspondence between points of interest in the matched features. In some embodiments, process 800 can use any suitable technique of combination of techniques to identify points of interest and/or correspondence between points of interest, such as techniques described above in connection with 514 and/or 516 of FIG. 5A.

At 816, process 800 can calculate an error metric for each corresponding pair of points using any suitable technique or combination of techniques, such as techniques described above in connection with 518 of FIG. 5A. In some embodiments, process 800 can return to 812 to determine whether there are any matched features remaining for the class of features being analyzed.

Figure 9:
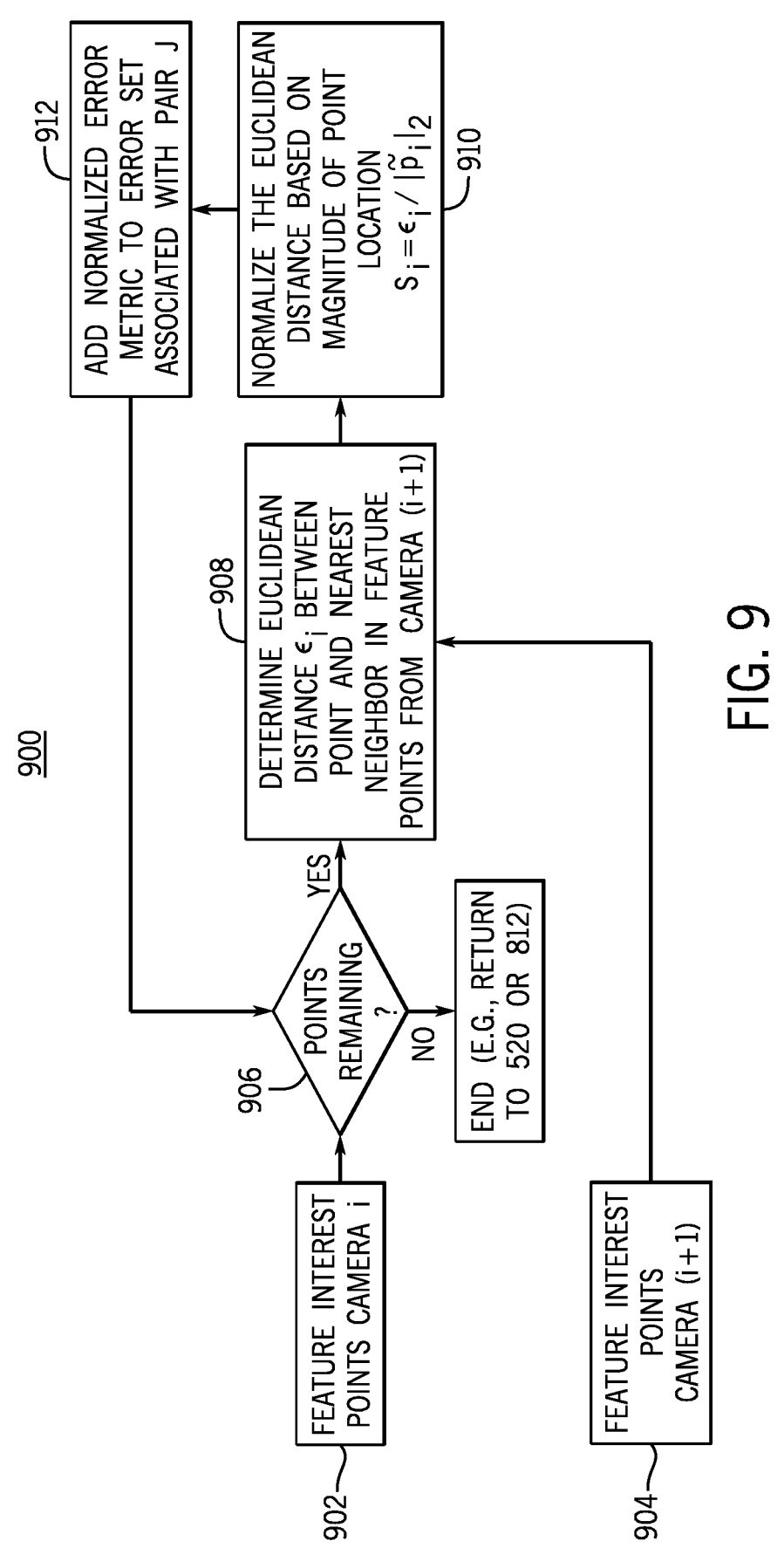
FIG. 9 shows an example of a process for calculating an error metric between a point of interest from a candidate feature detected by one camera and a nearest neighboring point of interest from a candidate feature detected by another camera in accordance with some embodiments of the disclosure.

FIG. 9 shows an example of a process 900 for calculating an error metric between a point of interest from a candidate feature detected by one camera and a nearest neighboring point of interest from a candidate feature detected by another camera in accordance with some embodiments of the disclosed subject matter.

At 902, process 900 can receive and/or retrieve (e.g., from memory 232) points of interest for a particular candidate feature for camera i in pair J that has been matched with a particular candidate feature for camera i+1 in pair J (e.g., indicating that the candidate features are likely to correspond to the same object in the environment, as captured by the two depth sensors).

At 904, process 900 can receive and/or retrieve (e.g., from memory 232) points of interest for the matched candidate feature for camera i+1 in pair J.

At 906, process 900 can determine whether there are any each points received/retrieved at 902 for which an error calculation has not been performed. If process 900 determines that there are no remaining points of interest ("NO" at 906), process 900 can end (e.g., by returning to a portion of process 500 and/or 800, such as 520 or 812). Otherwise, if process 900 determines that there is at least one remaining point of interest ("YES" at 906), process 900 can move to 908.

At 908, process 900 can determine a Euclidean distance $\epsilon_i$ between a particular point of interest, and the nearest point of interest in the feature points of interest from camera (i+1), using any suitable technique or combination of techniques, such as techniques described above in connection with 518 of FIG. 5A.

At 910, process 900 can normalize the Euclidean distance $\epsilon_i$ based on a magnitude of an estimated location of the point to which both points are expected to correspond (e.g., an estimated "true" location of the point). For example, as described above in connection with 518 of FIG. 5A, process 900 can calculate a normalized error $s_i$ for each unscaled error $e_i$. In some embodiments, the magnitude of the estimated location of the point can be based on the distance from a point in the global coordinate system (e.g., an origin, a location of a center of navigation, etc.).

At 912, process 900 can add the normalized error metric calculated at 910 to a set of normalized errors associated with the pair of cameras (e.g., Pair J), and can return to 906. In some embodiments, process 900 can determine errors for all points of interest identified by one of the depth sensors in the pair (e.g., the depth sensor that captured the data that generated fewer points of interest).

Figure 10:
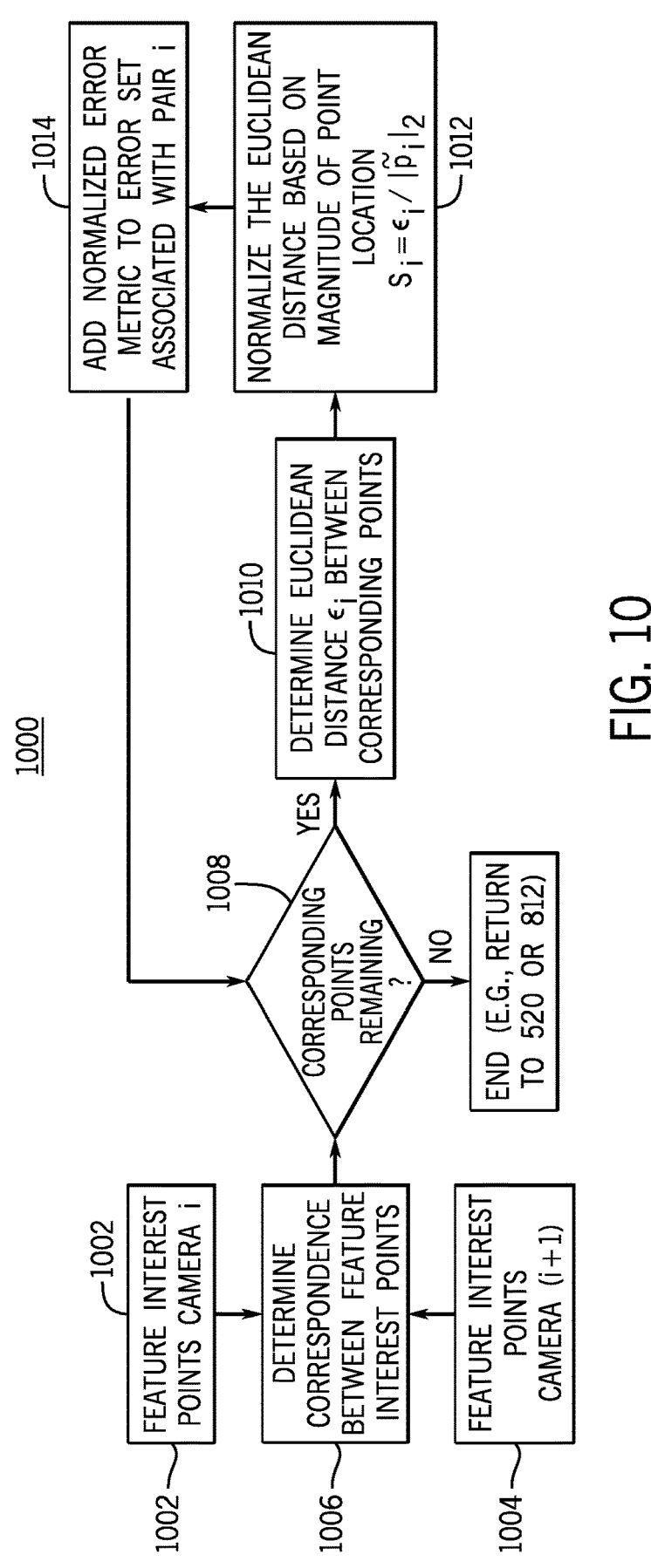
FIG. 10 shows an example of a process for calculating an error metric between a point of interest from a candidate feature detected by one camera and a point of interest from a candidate feature detected by another camera based on correspondence between the candidate features in accordance with some embodiments of the disclosure.

FIG. 10 shows an example of a process 1000 for calculating an error metric between a point of interest from a candidate feature detected by one camera and a point of interest from a candidate feature detected by another camera based on correspondence between the candidate features in accordance with some embodiments of the disclosed subject matter.

At 1002, process 1000 can receive and/or retrieve (e.g., from memory 232) points of interest for a particular candidate feature for camera i in pair J that has been matched with a particular candidate feature for camera i+1 in pair J (e.g., indicating that the candidate features are likely to correspond to the same object in the environment, as captured by the two depth sensors).

At 1004, process 1000 can receive and/or retrieve (e.g., from memory 232) points of interest for the matched candidate feature for camera i+1 in pair J.

At 1006, process 1000 can determine a correspondence between feature points of interest, such that each point of interest from camera i corresponds to a particular point of interest from camera (i+1), or to no other point (e.g., when there is no corresponding point). In some embodiments, process 1000 can use any suitable technique or combination of techniques to determine correspondence between points, such as techniques described above in connection with 516 of FIG. 5A.

At 1008, process 1000 can determine whether there are any points received/retrieved at 902 for which an error calculation has not been performed. If process 1000 determines that there are no remaining pairs of points of interest ("NO" at 1008), process 1000 can end (e.g., by returning to a portion of process 500 and/or 800, such as 520 or 812). Otherwise, if process 1000 determines that there is at least one remaining pair of points of interest ("YES" at 1008), process 1000 can move to 1010.

At 1010, process 1000 can determine a Euclidean distance $\epsilon_i$ between a particular point of interest, and the nearest point of interest in the feature points of interest from camera (i+1), using any suitable technique or combination of techniques, such as techniques described above in connection with 518 of FIG. 5A.

At 1012, process 1000 can normalize the Euclidean distance $\epsilon_i$ based on a magnitude of an estimated location of the point to which both points are expected to correspond (e.g., an estimated "true" location of the point). For example, as described above in connection with 518 of FIG. 5A, process 1000 can calculate a normalized error $s_i$ for each unscaled error $e_1$. In some embodiments, the magnitude of the estimated location of the point can be based on the distance from a point in the global coordinate system (e.g., an origin, a location of a center of navigation, etc.).

At 1014, process 1000 can add the normalized error metric calculated at 1012 to a set of normalized errors associated with the pair of cameras (e.g., Pair J), and can return to 1008.

Figure 11:
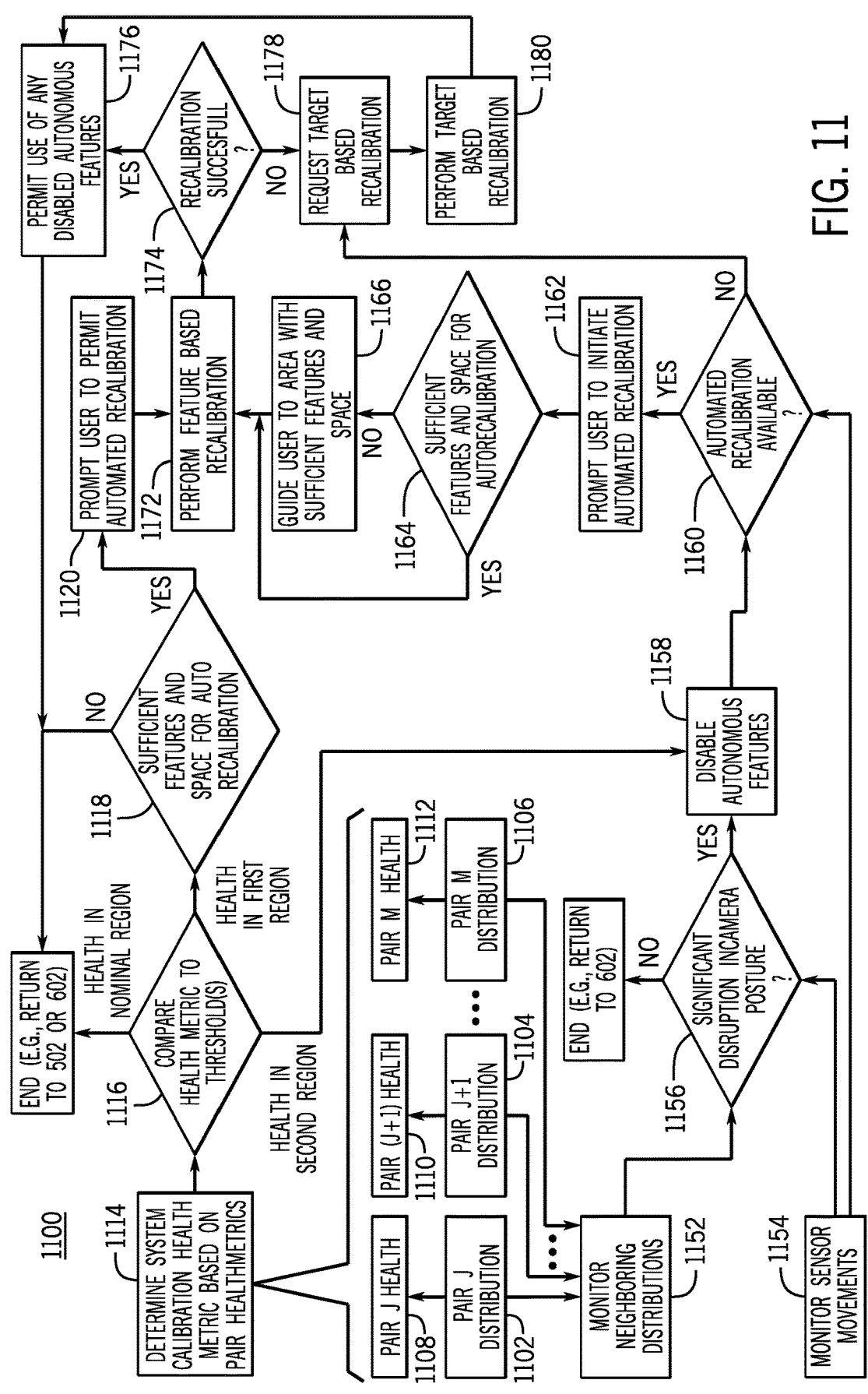
FIG. 11 shows an example of a process for managing autonomous navigation features of a marine vessel based on the calibration health of a vision system on the marine vessel in accordance with some embodiments of the disclosure.

FIG. 11 shows an example of a process 1100 for managing autonomous navigation features of a marine vessel based on the calibration health of a vision system on the marine vessel in accordance with some embodiments of the disclosed subject matter.

At 1102-1106, process 1100 can receive and/or retrieve (e.g., from memory 232) a distribution of error metrics (e.g., up to N error metrics, such as N scaled error metrics $\{s_{i-N}, \ldots, s_i\}$, or N unscaled error metrics $\{\epsilon_{i-N}, \ldots, \epsilon_1\}$) for each pair of depth sensors (e.g., pairs J through M). For example, the distributions can be based on error calculations performed using process 500 and/or process 700, described above in connection with FIGS. 5 and 7, respectively.

At 1108-1112, process 1100 can determine a pair calibration health metric for each pair of depth sensors using the respective distribution of error metrics. In some embodiments, process 1100 can use any suitable technique or combination of techniques to determine a calibration health metric for each pair of depth sensors, such as techniques described above in connection with 522 of FIG. 5A.

At 1114, process 1100 can determine a system calibration health metric based on the pair health metrics calculated at 1108-1112. In some embodiments, process 1100 can use any suitable technique or combination of techniques to determine a system calibration health metric for the vision system that includes the pairs of depth sensors, such as techniques described above in connection with 522 of FIG. 5A.

At 1116, process 1100 can compare the system calibration health metric (and/or each pair calibration health metric) to one or more thresholds to determine whether there is a significant degree of miscalibration, a critical degree of miscalibration, or a nominal degree of miscalibration (e.g., no more than an acceptable level of miscalibration). In some embodiments, process 1100 can use any suitable technique or combination of techniques to determine whether the degree of miscalibration it he vision system is nominal, significant, or critical, such as techniques described above in connection with 522-526 of FIGS. 5A and 5B. As described above, the calibration health metric can be a probability that the mean of the distribution is below (or above) a threshold error value (or scaled error value).

If process 1100 determines that system calibration health is nominal at 1116 ("Health in nominal region" at 1116), a portion of process 1100 that uses the system calibration health metric to monitor calibration health of the vision system (e.g., including 1108-1116) can end (e.g., by returning to a portion of process 500, 600, and/or 620, such as 502, 602, or 622). As described above in connection with 636 of FIG. 6B, the nominal region can be above a first threshold and a second threshold.

If process 1100 determines that the health metric is in a first region indicative of a significant degree of miscalibration ("Health in first region" at 1116), process 1100 can move to 1118. As described above in connection with 636 of FIG. 6B, the first region can be can be below a first threshold and above (or greater than or equal to) a second threshold, or above a first threshold and less than (or less than or equal to) a second threshold, depending on the metric used as the calibration health metric (e.g., a probability that the mean is below the error threshold value, a probability that the mean is above the error threshold value, the mean error, etc.).

At 1118, process 1100 can determine whether there are sufficient features (e.g., sufficient candidate features) and sufficient space (e.g., to position the vessel at a sufficient distance and/or number of distances) from the candidate features to position the candidate features in overlapping portions of each pair of depth sensors (e.g., at one or more distances from the depth sensors).

If process 1100 determines that there are not sufficient features and/or is not sufficient space ("NO" at 1118), process 1100 can end (e.g., by returning to a portion of process 500, 600, and/or 620, such as 502, 602, or 622). Otherwise, if process 1100 determines that there are sufficient features and is sufficient space ("YES" at 1118), process 1100 can move to 1120.

At 1120, process 1100 can prompt a user to permit an automated calibration (e.g., which may involve requesting a user to reposition the vessel to bring a feature into a specific area of a pair of depth sensor FOVs). In some embodiments, the prompt can be presented using any suitable technique or combination of techniques (e.g., via a user interface presented by a display of vessel 10, via a user interface of an application being executed on a mobile device paired with vessel 10, via a push notification to a mobile device, via email, via text message, etc.).

At 1152, process 1100 can monitoring neighboring distributions (e.g., the distributions of Pair J and Pair J+1, Pair J+1 and Pair J+2, . . . , Pair M−1 and Pair M, etc. In some embodiments, process 1100 can use any suitable technique or combination of techniques to monitor the neighboring distributions, such as techniques described above in connection with 624 and 626 of FIG. 6B.

At 1154, process 1100 can monitor movement of depth sensors (e.g., depth sensors included in Pairs J through M) to determine whether any sensor has changed posture with respect to the vessel to which the sensor is mounted. In some embodiments, process 1100 can use any suitable technique or combination of techniques to monitor movement of the depth sensors, such as techniques described above in connection with 628 and 630 of FIG. 6B. For example, process 1100 can utilize information from main IMU 36 and/or one or more of IMUs 62-68 to determine whether movement information from one of IMUs 62-68 is inconsistent with movement information from main IMU 36 and/or one or more other IMUs among IMUs 62-68 (e.g., based on a model, based on a direction of gravity vectors, etc.).

At 1156, process 1100 can determine whether there has been a significant disruption in the posture of one or more depth sensors (e.g., based on the distribution information and/or the movement information indicating that a depth sensor disruption).

If process 1100 determines that there has not been a significant disruption in posture ("NO" at 1156), a portion of process 1100 that uses neighboring distributions and/or movement data to monitor disruptions in sensor posture that can impact calibration health of the vision system (e.g., including 1152-1156) can end (e.g., by returning to a portion of process 600 or 620, such as 602 or 622 or FIG. 6A or 6B, respectively).

Otherwise, if process 1100 determines that there has been a significant disruption in posture ("YES" at 1156), process 1100 can move to 1158. Additionally or alternatively, if process 1100, at 1118, determines that the health metric is in a second region indicative of a critical degree of miscalibration ("Health in second region" at 1118), process 1100 can move to 1158. As described above in connection with 636 of FIG. 6B, the second region can be can be below (or less than or equal to) a second threshold, or greater than (or greater than or equal to) a second threshold, depending on the metric used as the calibration health metric.

At 1158, process 1100 can disable one or more autonomous navigation features (e.g., as described above in connection with 528 of FIG. 5B).

At 1160, process 1100 can determine whether an automated recalibration process (e.g., a feature-based recalibration process) is available. For example, sensor movement information monitored at 1154 indicates relatively continuous and/or frequent movement of a depth sensor that is inconsistent with movement of the vessel, it may indicate that the sensor is not well seated (e.g., it may be vibrating or shifting often during operation of the vessel due to a loose connection). In such an example, process 1100 can determine that automated recalibration is not available (e.g., as expected movement of the loose sensor is likely to cause the calibration to become quickly unreliable). As another example, process 1100 can determine whether the vessel is capable of performing a feature-based recalibration (e.g., whether it is programmed to do so, whether such a feature is enabled). As yet another example, process 1100 can determine whether the environment is conducive to performing a feature-based calibration (e.g., based on a density of candidate features). If process 1100 determines that automated recalibration is available, process 1100 can move to 1162.

At 1162, process 1100 can cause a prompt to be presented to a user (e.g., via a user interface presented by a display of vessel 10, via a user interface of an application being executed on a mobile device paired with vessel 10, via a push notification to a mobile device, via email, via text message, etc.) indicating that recalibration is needed and requesting that the user initiate an automated recalibration. In some embodiments, the prompt can include, or otherwise be associated with, an indication that one or more autonomous navigation features have been disabled due to the degree of miscalibration and/or the need for recalibration.

At 1164, process 1100 can determine whether there are sufficient features in a local environment (e.g., sufficient candidate features) and sufficient space (e.g., to position the vessel at a sufficient distance and/or number of distances) from the candidate features to position the candidate features in overlapping portions of each pair of depth sensors (e.g., at one or more distances from the depth sensors).

If process 1100 determines that there are sufficient features and is sufficient space ("YES" at 1164), process 1100 can move to 1172. Otherwise, if process 1100 determines that there are not sufficient features and/or is not sufficient space ("NO" at 1164), process 1100 can move to 1166.

At 1166, process 1100 can cause a user to be guided to an area with sufficient features and/or sufficient space (e.g., via instructions indicating types of objects and an amount of space that is needed to perform a feature-based calibration, via an indication of a known area that is likely to have sufficient features and space based on map data and/or a database of such areas).

At 1172, process 1100 can perform a feature-based calibration (e.g., using techniques described above in connection with 538 of FIG. 5).

At 1174, process 1100 can determine whether the feature-based recalibration was successful (e.g., as described above in connection with 540 of FIG. 5). If process 1100 determines that the recalibration was successful ("YES" at 1174), process 1100 can move to 1176, at which process 1100 can permit one or more autonomous features that were disabled at 1158 to be used (e.g., to be re-enabled). In some embodiments, 1176 can be omitted (e.g., if there are no autonomous features that have been disabled).

Otherwise, if process 1100 determines that the recalibration was not successful ("NO" at 1174), process 1100 can move to 1178. Additionally or alternatively, if process 1100 determines, at 1160, that an automated recalibration is not available ("NO" at 1160), process 1100 can move to 1178.

At 1178, process 1100 can prompt a user to request that the user have a target-based recalibration be performed (e.g., by a service technician), for example as described above in connection with 542 of FIG. 5B.

At 1180, process 1100 can include a target-based recalibration that is performed with the assistance and/or at the direction of a service technician.

In some embodiments, 1118, 1120, 1160-166, and 1172-1174 can be omitted, for example, if vessel 10 is not capable of performing a feature-based calibration.

FIG. 12A shows various distributions of error metrics corresponding to different calibration health levels of a vision system on the marine vessel in accordance with some embodiments of the disclosed subject matter.

As shown in FIG. 12A, a distribution of scaled error metrics can indicate a calibration health of a pair of depth sensors. As shown in the left-most panel, a distribution with an average that is well below a threshold scaled error value ("threshold") is likely to have good calibration health (e.g., the degree of miscalibration is likely to be acceptable).

As shown in the middle panel, the mean of the distribution can be below a threshold scaled error value ("threshold"), but the distribution can have a long tail due to various sources of noise and/or slow deterioration in the calibration performance. A pair of depth sensors exhibiting such a distribution can be significantly miscalibrated, or the long tail may be caused by noisy data that may be transient (e.g., due to a current environment, due to a dirty lens, etc.). In such an example (e.g., as described above in connection with 636 of FIG. 6B and/or 1116 of FIG. 11), mechanisms described herein can use a statistical test to estimate a probability that the true mean of the distribution is below the threshold scaled error value.

As shown in the right-most panel, a distribution with an average that is well above a threshold scaled error value ("threshold") is likely to have a calibration health that is critically miscalibrated (e.g., the degree of miscalibration is likely to be unsafe for autonomous navigation).

FIG. 12B shows changes in a distribution of error metrics over time that can be indicative of a large disruption to a camera of a vision system on the marine vessel in accordance with some embodiments of the disclosed subject matter.

As shown in FIG. 12B, the shape of a distribution can shift relatively dramatically in a relatively short period of time. For example, if a posture of a depth sensor shifted (e.g., due to an impact) prior to the time depicted in the left-most panel, the mean of the N stored error metrics that the distribution is based on can be expected to shift relatively quickly as relatively low errors are replaced by relatively high errors as the now-shifted depth sensor is no longer well calibrated. It can be desirable to determine that the vision system needs to be recalibrated in such a situation relatively quickly, as reliance on the depth information from the shifted depth sensor may cause a collision during an automated navigation maneuver (such as automatic docking). As described above in connection with FIGS. 6 and 11, mechanisms described herein can be configured to disable automated navigation features when the distribution of a pair (or adjacent pairs) of depth sensors becomes bimodal. Note that the period of time over which the distribution can shift may depend on the rate of data collection and the total number of samples in the distribution. For example, for N=1000, if 50 error values are calculated every sample, and samples are collected once per second, the shift in FIG. 12B may happen over a period of about 20 seconds.

Figure 13:
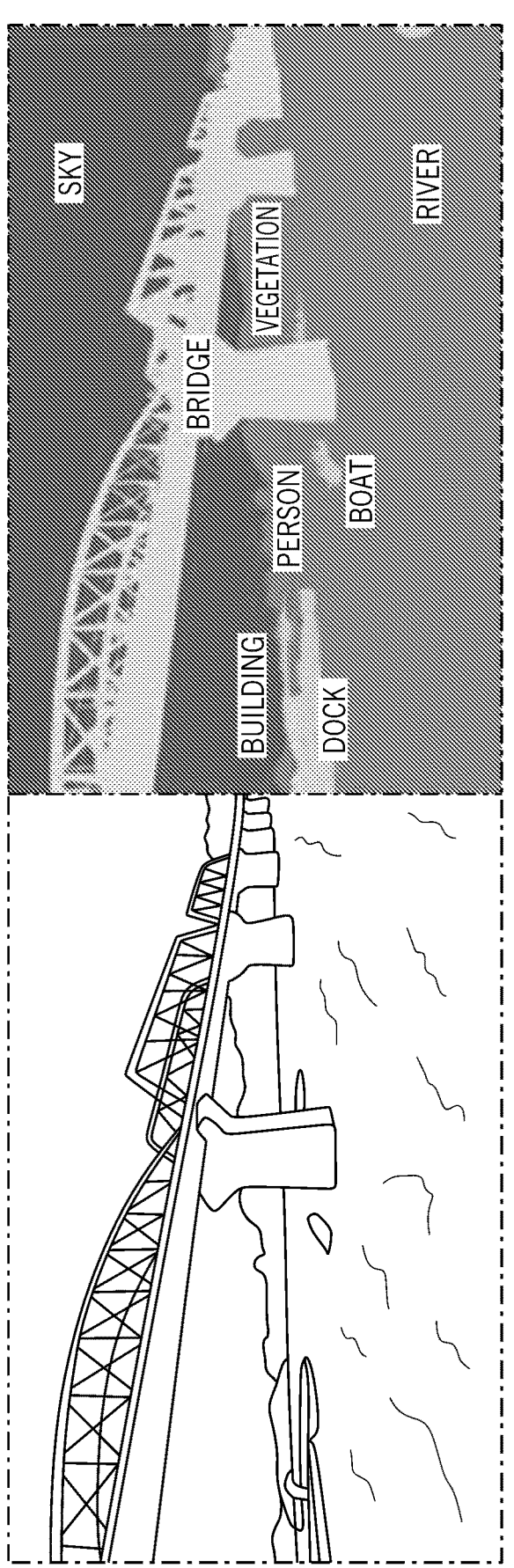
FIG. 13 shows an example of an image and segmentation information generated based on the image.

FIG. 13 shows an example of an image and segmentation information generated based on the image. The left panel of FIG. 13 shows a color image captured by a depth camera, such as an image sensor of a stereoscopic camera. The right panel shows segmentation information generated by a trained machine learning model from the color image on the left. As shown in FIG. 13, the segmentation information specifies a class for each portion (e.g., each pixel) of the color image. As described above, in some embodiments, the segmentation information can include a set of masks, with each mask corresponding to a particular class of feature. In some embodiments, depth information from a depth sensor (e.g., a stereoscopic camera that generated the color image) can be associated with the segmentation information. This can facilitate labeling of points in a depth map or point cloud generated from the depth information produced by the depth sensor as being associated with particular types of objects. Such information can be used to assist in autonomous navigation, and can also be used to generate calibration error information using mechanisms described herein. For example, using the label information from the segmentation information to identify points corresponding to particular features can facilitate associating points that can be expected to represent the same point of a physical object. Using the correspondence, mechanisms described herein can calculate how a difference in the position of the point measured by two depth sensors that both observed the object.

FURTHER EXAMPLES HAVING A VARIETY OF FEATURES

Implementation examples are described in the following numbered clauses:

1. A method for monitoring calibration of a vision system on a marine vessel, the method comprising: determining three-dimensional location information associated with a first candidate feature in a three-dimensional global coordinate system based on calibration information indicative of a transform between a first three-dimensional camera coordinate system associated with a first camera and the global coordinate system, wherein the first camera is configured to be mounted to the marine vessel with an associated field of view of an environment of the marine vessel, and wherein the first camera is associated with the three-dimensional camera coordinate system; determining that the first candidate feature is within a region of the field of view associated with the first camera that overlaps a region of a field of view associated with a second camera, wherein the second camera is configured to be mounted to the marine vessel with an associated field of view of an environment of the marine vessel, and wherein the second camera is associated with a second three-dimensional camera coordinate system; determining a distance between a first three-dimensional location of a point on the first candidate feature in the global coordinate system and a second three-dimensional location of a corresponding point in the global coordinate system, wherein the first three-dimensional location is based on a three-dimensional location of the point in the first camera coordinate system, and the second three-dimensional location is based on a three-dimensional location of the corresponding point in the second camera coordinate system;

adding a first error metric to a data structure, wherein the first error metric is based on the distance; calculating a calibration health metric based on error metrics stored in the data structure; determining that the calibration health metric is indicative of at least a threshold degree of miscalibration; and generating a calibration alert.

2. The method of clause 1, further comprising: in response to determining that the calibration health metric is indicative of at least the threshold degree of miscalibration, causing one or more autonomous navigation features of the marine vessel to be disabled.

3. The method of any one of clauses 1 or 2, wherein the one or more autonomous navigation features includes guiding the marine vessel during docking.

4. The method of any one of clauses 1 to 3, further comprising: receiving segmentation information associated with the first camera, wherein the segmentation information includes classification information associated with features located in the field of view associated with the first camera; and identify at least the first candidate feature based on the segmentation information.

5. The method of clause 4, further comprising: receiving second segmentation information associated with the second camera; and determining three-dimensional location information associated with a second candidate feature in the three-dimensional global coordinate method based on calibration information indicative of a transform between the camera coordinate method associated with the second camera and the global coordinate method.

6. The method of clause 5, further comprising: identifying at least a second candidate feature based on the second segmentation information; and determining that the second candidate feature is within a region of the field of view associated with the second camera that overlaps a region of a field of view associated with the first camera.

7. The method of clause 4, wherein the segmentation information comprises a mask including a plurality of data elements, each data element of the plurality of data elements corresponding to at least one pixel, and each data element of the plurality of data elements indicating a predicted class of a plurality of classes of a feature in the image at a position corresponding to the at least one pixel.

8. The method of clause 4, further comprising: receiving an image from the first camera; providing the image to a machine learning model trained to classify features in the image and generate a predicted class for each feature of the image; and receiving, from the machine learning model, the segmentation information.

9. The method of clause 8, wherein the plurality of classes includes: at least one class corresponding to a water surface; at least one class corresponding to vessels; at least one class corresponding to sky; and at least one class corresponding to a dock.

10. The method of clause 9, further comprising: determining that a predicted class of the first candidate feature is included in a first subset of the plurality of classes, wherein the first subset of the plurality of classes includes classes that are likely to include multiple distinct points of interest.

11. The method of any one of clauses 1 to 10, wherein each camera of the plurality of cameras comprises a stereoscopic camera.

12. The method of any one of clauses 1 to 11, further comprising: identifying a plurality of points of interest on the first candidate feature, wherein the plurality of points of interest includes the point on the first candidate feature.

13. The method of clause 12, further comprising: receiving segmentation information associated with the first camera, wherein the segmentation information includes classification information associated with features located in the field of view associated with the first camera; and identifying at least the first candidate feature based on the segmentation information identifying, for each of the plurality of points of interest located within the region of the field of view associated with the first camera that overlaps the region of the field of view associated with the second camera, a corresponding point of interest on a candidate feature identified based on segmentation information associated with the second camera.

14. The method of clause 13, further comprising: identifying, for each of the plurality of points of interest located within the region of the field of view associated with the first camera that overlaps the region of the field of view associated with the second camera, a point of interest on the candidate feature identified based on segmentation information associated with the second camera that is closest to that point of interest in the global coordinate method.

15. The method of any one of clauses 1 to 14, wherein the data structure comprises a first-in-first-out data structure configured to store up to N values.

16. The method of any one of clauses 1 to 15, further comprising: removing an oldest error metric from the data structure in connection with adding the first error metric to the data structure.

17. The method of any one of clauses 1 to 16, wherein the calibration health metric is based on up to N most recent error metric values stored in the data structure.

18. The method of any one of clauses 1 to 17, wherein the first error metric is based on a Euclidean distance between the first three-dimensional location and the second three-dimensional location.

19. The method of clause 18, wherein the first error metric is scaled based on a magnitude of an estimated location of the point on the first candidate feature.

20. The method of clause 19, wherein the estimated location of the point is based on a mean of the first three-dimensional location and the second three-dimensional location.

21. The method of clause 19, further comprising: estimating a likelihood that a mean of a distribution of a plurality of error metrics stored in the data structure is less than a threshold; and in response to determining that the likelihood is less than a threshold, determining that the calibration health metric is indicative of at least a critical degree of miscalibration.

22. The method of any one of clauses 1 to 21, further comprising: determining that the calibration health metric is within a first range; and in response to determining that the calibration health metric is within the first range, generating the calibration alert.

23. The method of clause 22, further comprising: determining that the calibration health metric is less than a first threshold, and greater than or equal to a second threshold.

24. The method of any one of clauses 1 to 23, further comprising: determining that the calibration health metric is within a second range; and in response to determining that the calibration health metric is within the second range, determining that the calibration health metric is indicative of at least the threshold degree of miscalibration of at least one camera of the plurality of cameras.

25. The method of clause 24, further comprising: determining that the calibration health metric is less than a second threshold.

26. A method for monitoring calibration of a vision system on a marine vessel, the method comprising: receiving a plurality of error metrics, each indicative of a degree of miscalibration between a pair of depth sensors, wherein each of the depth sensors is configured to determine three-dimensional position information of features in an environment of the marine vessel; calculating a calibration health metric based on the plurality of error metrics; determining that the calibration health metric is indicative of at least a threshold degree of miscalibration of at least one of the pair of depth sensors; and generating a calibration alert.

27. The method of clause 26, wherein the calibration alert comprises a user prompt to initiate a recalibration process.

28. The method of any one of clauses 26 or 27, wherein each of the plurality of error metrics is based on a distance between a three-dimensional location of a point determined using a first depth sensor of the pair of depth sensors and a corresponding point determined using a second depth sensor of the pair of depth sensors, wherein the point is a particular point on a feature.

29. The method of any one of clauses 26 to 28, further comprising: determining that the calibration health metric is within a first range; and in response to determining that the calibration health metric is within the first range, determining that the calibration health metric is indicative of at least a threshold degree of miscalibration of at least one of the pair of depth sensors.

30. The method of clause 29, further comprising: determining that the calibration health metric is less than a first threshold, and greater than or equal to a second threshold.

31. The method of any one of clauses 26 to 30, further comprising: determining that the calibration health metric is within a second range; in response to determining that the calibration health metric is within the second range, determine that the calibration health metric is indicative of at least a critical degree of miscalibration of at least one of the pair of depth sensors; and cause one or more autonomous navigation features of the marine vessel to be disabled.

32. The method of clause 31, further comprising: determining that the calibration health metric is less than a second threshold.

33. The method of clause 31, wherein the one or more autonomous navigation features includes guiding the marine vessel to dock based on the three-dimensional position information.

34. The method of any one of clauses 26 to 33, wherein the calibration health metric is based on a likelihood that a mean of a distribution of the plurality of error metrics is less than a threshold error metric value.

35. The method of clause 34, further comprising: estimating a likelihood that the mean of the distribution is less than the threshold error metric value based on a one-sided test of the distribution.

36. The method of any one of clauses 26 to 35, wherein the pair of depth sensors is a first pair of depth sensors, the method further comprising: receiving a second plurality of error metrics, each indicative of a degree of miscalibration between a second pair of depth sensors, the second pair of depth sensors including at least a first depth sensor of the first pair of depth sensors; and determining that a posture of the first depth sensor has changed relative to the marine vessel based on a distribution of the plurality of error metrics and a distribution of the second plurality of error metrics.

37. The method of clause 36, wherein determining that the posture of the first depth sensor has changed includes determining that the distribution of the plurality of error metrics and the distribution of the second plurality of error metrics have both become bimodal.

38. The method of clause 36, further comprising: in response to determining that the posture of the first depth sensor has changed relative to the marine vessel, causing one or more autonomous navigation features of the marine vessel to be disabled.

39. The method of any one of clauses 26 to 38, further comprising: receiving information indicative of a change in posture of a first depth sensor of the pair of depth sensors; receiving information indicative of a change in posture of the marine vessel; determining that the change in posture of the first depth sensor is inconsistent with the change in posture of the marine vessel; and in response to determining that the change in posture of the first depth sensor is inconsistent with the change in posture of the marine vessel, causing one or more autonomous navigation features of the marine vessel to be disabled.

40. The method of clause 39, wherein the information indicative of the change in posture of the first depth sensor comprises acceleration information.

41. The method of any one of clauses 26 to 40, wherein the pair of depth sensors is a first pair of depth sensors, the method further comprising: receiving a second plurality of error metrics, each indicative of a degree of miscalibration between a second pair of depth sensors, the second pair of depth sensors including at least a first depth sensor of the first pair of depth sensors; determining that a posture of the first depth sensor has changed relative to the marine vessel based on a distribution of the plurality of error metrics and a distribution of the second plurality of error metrics; receiving information indicative of a change in posture of a first depth sensor of the pair of depth sensors; receiving information indicative of a change in posture of the marine vessel; determining that the change in posture of the first depth sensor is inconsistent with the change in posture of the marine vessel; and in response to determining that the posture of the first depth sensor has changed relative to the marine vessel based on the distribution of the plurality of error metrics and a distribution of the second plurality of error metrics and determining that the change in posture of the first depth sensor is inconsistent with the change in posture of the marine vessel, causing one or more autonomous navigation features of the marine vessel to be disabled.

42. The method of any one of clauses 26 to 41, wherein each depth sensor of the pair of depth sensors comprises a stereoscopic camera.

43. A system for monitoring calibration of a vision system on a marine vessel, comprising: one or more processors configured to: perform a method of any of clauses 1 to 42.

44. A non-transitory computer-readable medium storing computer-executable code, comprising code for causing a computer to cause a processor to: perform a method of any of clauses 1 to 42.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EE-PROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 5A-11 can be executed or performed in any suitable order or sequence not limited to the order and sequence shown and described in the figures. Also, some of the above steps of the processes of FIGS. 5A-11 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for monitoring calibration of a vision system on a marine vessel, the system comprising:
  one or more hardware processors configured to:
    receive a plurality of error metrics, each indicative of a degree of miscalibration between a pair of depth sensors,
      wherein each of the depth sensors is configured to determine three-dimensional position information of features in an environment of the marine vessel;
    calculate a calibration health metric based on the plurality of error metrics;
    determine that the calibration health metric is indicative of at least a threshold degree of miscalibration of at least one of the pair of depth sensors;
    generate a calibration alert; and
    cause one or more autonomous navigation features of the marine vessel to be disabled while the marine vessel is being controlled using one or more manually operable user input devices.

2. The system of claim 1, wherein the calibration alert comprises a user prompt to initiate a recalibration process.

3. The system of claim 1, wherein each of the plurality of error metrics is based on a distance between a three-dimensional location of a point determined using a first depth sensor of the pair of depth sensors and a corresponding point determined using a second depth sensor of the pair of depth sensors,
  wherein the point is a particular point on a feature.

4. The system of claim 1, wherein the one or more hardware processors are further configured to:
  determine that the calibration health metric is within a first range; and
  in response to determining that the calibration-health metric is within the first range, determine that the calibration health metric is indicative of at least a threshold degree of miscalibration of at least one of the pair of depth sensors.

5. The system of claim 4, wherein the one or more hardware processors are further configured to:
  determine that the calibration health metric is less than a first threshold, and greater than or equal to a second threshold.

6. The system of claim 1, wherein the one or more hardware processors are further configured to:
  determine that the calibration health metric is within a second range; and
  in response to determining that the calibration health metric is within the second range, determine that the calibration health metric is indicative of at least a critical degree of miscalibration of at least one of the pair of depth sensors.

7. The system of claim 6, wherein the one or more hardware processors are further configured to:
  determine that the calibration health metric is less than a second threshold.

8. The system of claim 1, wherein the plurality of error metrics are each indicative of the degree of miscalibration between the pair of depth sensors during a first period of time, and
  wherein the one or more hardware processors are further configured to:
    receive additional error metrics, each indicative of a degree of miscalibration between the pair of depth sensors during a second period of time that is different than the first period of time; and
    calculate the calibration health metric based on the plurality of error metrics and the additional error metrics.

9. The system of claim 1, wherein the calibration health metric is based on a likelihood that a mean of a distribution of the plurality of error metrics is less than a threshold error metric value.

10. The system of claim 9, wherein the one or more hardware processors are further configured to:
  estimate a likelihood that the mean of the distribution is less than the threshold error metric value based on a one-sided test of the distribution.

11. The system of claim 1, wherein the pair of depth sensors is a first pair of depth sensors and the one or more hardware processors are further configured to:
  receive a second plurality of error metrics, each indicative of a degree of miscalibration between a second pair of depth sensors, the second pair of depth sensors including at least a first depth sensor of the first pair of depth sensors; and
  determine that a posture of the first depth sensor has changed relative to the marine vessel based on a distribution of the plurality of error metrics and a distribution of the second plurality of error metrics.

12. The system of claim 11,
  wherein determining that the posture of the first depth sensor has changed includes determining that the distribution of the plurality of error metrics and the distribution of the second plurality of error metrics have both become bimodal.

13. The system of claim 11, wherein the one or more hardware processors are further configured to:
  in response to determining that the posture of the first depth sensor has changed relative to the marine vessel, cause an autonomous navigation feature of the one or more autonomous navigation features of the marine vessel to be disabled.

14. The system of claim 1, wherein the one or more hardware processors are further configured to:

receive information indicative of a change in posture of a first depth sensor of the pair of depth sensors;

receive information indicative of a change in posture of the marine vessel;

determine that the change in posture of the first depth sensor is inconsistent with the change in posture of the marine vessel; and in response to determining that the change in posture of the first depth sensor is inconsistent with the change in posture of the marine vessel, cause an autonomous navigation feature of the one or more autonomous navigation features of the marine vessel to be disabled.

15. The system of claim 14, wherein the information indicative of the change in posture of the first depth sensor comprises acceleration information.

16. The system of claim 1, wherein the pair of depth sensors is a first pair of depth sensors and the one or more hardware processors are further configured to:

receive a second plurality of error metrics, each indicative of a degree of miscalibration between a second pair of depth sensors, the second pair of depth sensors including at least a first depth sensor of the first pair of depth sensors;

determine that a posture of the first depth sensor has changed relative to the marine vessel based on a distribution of the plurality of error metrics and a distribution of the second plurality of error metrics;

receive information indicative of a change in posture of a first depth sensor of the pair of depth sensors;

receive information indicative of a change in posture of the marine vessel;

determine that the change in posture of the first depth sensor is inconsistent with the change in posture of the marine vessel; and in response to determining that the posture of the first depth sensor has changed relative to the marine vessel based on the distribution of the plurality of error metrics and a distribution of the second plurality of error metrics and determining that the change in posture of the first depth sensor is inconsistent with the change in posture of the marine vessel, cause an autonomous navigation feature of the one or more autonomous navigation features of the marine vessel to be disabled.

17. The system of claim 1, wherein each depth sensor of the pair of depth sensors comprises a stereoscopic camera.

18. A method for monitoring calibration of a vision system on a marine vessel, the method comprising:

receiving a plurality of error metrics, each indicative of a degree of miscalibration between a pair of depth sensors, wherein each of the depth sensors is configured to determine three-dimensional position information of features in an environment of the marine vessel;

calculating a calibration health metric based on the plurality of error metrics;

determining that the calibration health metric is indicative of at least a threshold degree of miscalibration of at least one of the pair of depth sensors;

generating a calibration alert; and cause one or more autonomous navigation features of the marine vessel to be disabled while the marine vessel is being controlled using one or more manually operable user input devices.

19. The method of claim 18, wherein the calibration alert comprises a user prompt to initiate a recalibration process.

20. The method of claim 18, further comprising:

determining that the calibration health metric is within a first range; and in response to determining that the calibration health metric is within the first range, determining that the calibration health metric is indicative of at least a threshold degree of miscalibration of at least one of the pair of depth sensors.

21. The method of claim 20, further comprising:

determine that the calibration health metric is less than a first threshold, and greater than or equal to a second threshold.

22. The method of claim 18, wherein the calibration health metric is based on a likelihood that a mean of a distribution of the plurality of error metrics is less than a threshold error metric value.

23. The method of claim 18, wherein each depth sensor of the pair of depth sensors comprises a stereoscopic camera.

* * * * *